US012783726B2

(12) United States Patent
Nozawa et al.

(10) Patent No.: US 12,783,726 B2
(45) Date of Patent: Nov. 3, 2026

(54) PRIVACY-PROTECTED DATA AGGREGATION DEVICE AND PRIVACY-PROTECTED DATA AGGREGATION SYSTEM

(71) Applicant: NTT DOCOMO, INC., Tokyo (JP)

(72) Inventors: Kazuma Nozawa, Chiyoda-ku (JP); Keita Hasegawa, Chiyoda-ku (JP); Tomohiro Nakagawa, Chiyoda-ku (JP); Hiroshi Aono, Chiyoda-ku (JP); Masayuki Terada, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 39 days.

(21) Appl. No.: 18/727,143

(22) PCT Filed: Nov. 29, 2022

(86) PCT No.: PCT/JP2022/043974
§ 371 (c)(1),
(2) Date: Jul. 8, 2024

(87) PCT Pub. No.: WO2023/139934
PCT Pub. Date: Jul. 27, 2023

(65) Prior Publication Data
US 2025/0094632 A1 Mar. 20, 2025

(30) Foreign Application Priority Data
Jan. 21, 2022 (JP) ................................ 2022-007911

(51) Int. Cl.
*G06F 21/00* (2013.01)
*G06F 21/62* (2013.01)

(52) U.S. Cl.
CPC ................................ *G06F 21/6254* (2013.01)

(58) Field of Classification Search
CPC ..... G06F 21/6254; G06F 21/62; H04L 9/008; H04L 9/30
See application file for complete search history.

(56) References Cited

U.S. PATENT DOCUMENTS 9,876,766 B2 * 1/2018 Ukena .................. H04L 63/061
2014/0298030 A1 * 10/2014 Akiyama ............. H04L 63/062 713/172
2015/0371059 A1 * 12/2015 Bilogrevic ............. H04L 9/085 726/26
2016/0203336 A1 * 7/2016 Nambiar ............ G06F 21/6245 726/26
(Continued)

FOREIGN PATENT DOCUMENTS

JP 2010-108488 A 5/2010
JP 2019-35949 A 3/2019
(Continued)

OTHER PUBLICATIONS

Zhang et al., "Privacy-Preserving Data Aggregation in Mobile Phone Sensing," in IEEE Transactions on Information Forensics and Security, vol. 11, No. 5, pp. 980-992, May 2016.*
(Continued)

*Primary Examiner* — Morshed Mehedi
(74) *Attorney, Agent, or Firm* — Oblon, McClelland, Maier & Neustadt, L.L.P.

(57) ABSTRACT

A privacy-protected data aggregation device (10) includes: an attribute information encryption unit (13) that encrypts attribute information in user data to be aggregated, which includes a plurality of pieces of attribute information, using a homomorphic encryption method enabling aggregation processing; an aggregation processing unit (14) that aggregates user data with encrypted attribute information, for all combinations of possible values of the plurality of pieces of attribute information in domain data that defines possible values of each of the pieces of attribute information included in the user data, to obtain aggregated data including an aggregation result and encrypted attribute information; an anonymization processing unit (15) that performs anony-
(Continued)

mization processing on the aggregated data; and a decryption unit (16) that decrypts aggregated data subjected to the anonymization processing to obtain aggregated data including an aggregation result after the anonymization processing and decrypted attribute information.

4 Claims, 34 Drawing Sheets

(56) References Cited

U.S. PATENT DOCUMENTS

| | | | | |
|---|---|---|---|---|
| 2017/0124335 | A1* | 5/2017 | Freudiger | G06F 21/6254 |
| 2019/0190701 | A1* | 6/2019 | Mitra | G06N 5/022 |
| 2020/0019228 | A1* | 1/2020 | Varshavsky | G06F 1/3234 |

FOREIGN PATENT DOCUMENTS

| | | | | | |
|---|---|---|---|---|---|
| WO | WO-2019116112 | A1 | * | 6/2019 | H04L 9/14 |
| WO | WO-2021090032 | A1 | * | 5/2021 | G06F 16/2365 |

OTHER PUBLICATIONS

Zhou et al., "Efficient Privacy-Preserving Ciphertext-Policy Attribute Based-Encryption and Broadcast Encryption", IEEE Transactions On Computers, vol. 64, No. 1, Jan. 2015.*

International Search Report issued on Feb. 14, 2023 in PCT/JP2022/043974 filed on Nov. 29, 2022, 2 pages.

Katayama et al., "Performance Comparison of Two-Party Secure Anonymized Cross Tabulation Protocol with Fully Homomorphic Encryption", Proceedings of Information Processing Society, Jun. 15, 2020, vol. 61, No. 6, pp. 1175-1189 (with English Abstract and partial English translation, 18 total pages).

Japanese Office Action issued Jun. 24, 2025 in Japanese Patent Application No. 2023-575102 (with English Translation), 8 pages.

European Office Action issued Aug. 28, 2025 in European Patent Application No. 22922085.0, 6 pages.

Extended European Search Report issued Feb. 21, 2025, in corresponding European Patent Application No. 22922085.0, 9 pages.

International Preliminary Report on Patentability and Written Opinion issued Aug. 2, 2024 in PCT/JP2022/043974, 6 pages.

Japanese Office Action issued Apr. 7, 2026 in Japanese Patent Application No. 2023-575102 (with English Translation), 6 pages.

Gorlartykh et al., "Challenges of Privacy-Preserving OLAP Techniques", 2017 IEEE Russia Section Young Researchers in Electrical and Electronic Engineering Conference (2017 EIConRus), Feb. 1-3, 2017, pp. 404-408 (Total 7 pages).

Kurauchi et al., "Small cube building considering statistical errors for business intelligence using MOLAP", IPSJ SIG Technical Report,vol. 2020-GN-110 No.13, Mar. 17, 2020, 7 pages (with Partial English Translation).

* cited by examiner

*Fig.9*

USER DATA

| ID | PLACE OF DEPARTURE | PLACE OF ARRIVAL |
|---|---|---|
| xxx | NARITA | NAHA |
| yyy | HANEDA | ITAMI |
| zzz | NARITA | NAHA |
| .. | .. | .. |

AGGREGATION TARGET LIST

| PLACE OF DEPARTURE | PLACE OF ARRIVAL |
|---|---|
| NARITA | NAHA |
| HANEDA | ITAMI |
| NAHA | NARITA |
| HANEDA | NAHA |
| .. | .. |
| KAGOSHIMA | NAHA |

AGGREGATION

AGGREGATED DATA

| PLACE OF DEPARTURE | PLACE OF ARRIVAL | NUMBER OF PEOPLE |
|---|---|---|
| NARITA | NAHA | 60 PEOPLE |
| HANEDA | ITAMI | 50 PEOPLE |
| NAHA | NARITA | 20 PEOPLE |
| HANEDA | NAHA | 60 PEOPLE |
| .. | .. | .. |
| KAGOSHIMA | NAHA | 0 PEOPLE |

ANONYMIZATION PROCESSING & DECRYPTION

AGGREGATED DATA AFTER ANONYMIZATION PROCESSING

| PLACE OF DEPARTURE | PLACE OF ARRIVAL | NUMBER OF PEOPLE |
|---|---|---|
| NARITA | NAHA | 58 PEOPLE |
| HANEDA | ITAMI | 51 PEOPLE |
| NAHA | NARITA | 22 PEOPLE |
| HANEDA | NAHA | 57 PEOPLE |
| .. | .. | .. |
| KAGOSHIMA | NAHA | 2 PEOPLE |

Fig.12

(a)

COMPANY A'S USER DATA

| $ID^A$ | PLACE OF DEPARTURE | PLACE OF ARRIVAL |
|---|---|---|
| 1 | NARITA | NAHA |
| 2 | HANEDA | ITAMI |
| : | : | : |

COMPANY A'S DOMAIN DATA

| PLACE OF DEPARTURE | PLACE OF ARRIVAL |
|---|---|
| HANEDA | HANEDA |
| NAHA | NAHA |
| FUKUOKA | FUKUOKA |
| : | : |

(b)

COMPANY B'S USER DATA

| $ID^B$ | PLACE OF DEPARTURE | PLACE OF ARRIVAL | MEANS OF TRANSPORTATION |
|---|---|---|---|
| 1 | CHIBA | OKINAWA | AIRPLANE |
| 2 | TOKYO | OSAKA | SHINKANSEN |
| : | : | : | : |

COMPANY B'S DOMAIN DATA

| PLACE OF DEPARTURE | PLACE OF ARRIVAL | MEANS OF TRANSPORTATION |
|---|---|---|
| HOKKAIDO | HOKKAIDO | AIRPLANE |
| AOMORI | AOMORI | SHINKANSEN |
| IWATE | IWATE | CAR |
| : | : | : |

Fig.13

AGGREGATION IMAGE

| No | PLACE OF DEPARTURE | PLACE OF ARRIVAL | PLACE OF DEPARTURE | PLACE OF ARRIVAL | MEANS OF TRANSPORTATION | AGGREGATION RESULT |
|---|---|---|---|---|---|---|
| 1 | HANEDA | HANEDA | HOKKAIDO | HOKKAIDO | AIRPLANE | |
| 2 | HANEDA | HANEDA | HOKKAIDO | HOKKAIDO | SHINKANSEN | |
| 3 | HANEDA | HANEDA | HOKKAIDO | HOKKAIDO | CAR | |
| 4 | HANEDA | HANEDA | HOKKAIDO | AOMORI | AIRPLANE | |
| : | : | : | : | : | : | |

Fig.18

MATCHED DATA

| PLACE OF DEPARTURE | PLACE OF ARRIVAL | PLACE OF DEPARTURE | PLACE OF ARRIVAL | MEANS OF TRANSPORTATION |
|---|---|---|---|---|
| NARITA | NAHA | CHIBA | OKINAWA | AIRPLANE |
| HANEDA | ITAMI | TOKYO | OSAKA | SHINKANSEN |
| HANEDA | KANSAI INTERNATIONAL | TOKYO | OSAKA | SHINKANSEN |
| NARITA | NAHA | CHIBA | OKINAWA | AIRPLANE |
| HANEDA | ITAMI | TOKYO | OSAKA | SHINKANSEN |

COMPANY A'S ATTRIBUTE INFORMATION (first two columns); COMPANY B'S ATTRIBUTE INFORMATION (last three columns)

MATCHED DATA CATEGORIZED BASED ON COMPANY B'S ATTRIBUTE INFORMATION

| PLACE OF DEPARTURE | PLACE OF ARRIVAL | PLACE OF DEPARTURE | PLACE OF ARRIVAL | MEANS OF TRANSPORTATION |
|---|---|---|---|---|
| NARITA | NAHA | CHIBA | OKINAWA | AIRPLANE |
| NARITA | NAHA | CHIBA | OKINAWA | AIRPLANE |
| HANEDA | ITAMI | TOKYO | OSAKA | SHINKANSEN |
| HANEDA | KANSAI INTERNATIONAL | TOKYO | OSAKA | SHINKANSEN |
| HANEDA | ITAMI | TOKYO | OSAKA | SHINKANSEN |

Fig.19

MATCHED DATA CATEGORIZED BASED ON COMPANY B'S ATTRIBUTE INFORMATION

| PLACE OF DEPARTURE | PLACE OF ARRIVAL | PLACE OF DEPARTURE | PLACE OF ARRIVAL | MEANS OF TRANSPORTATION |
|---|---|---|---|---|
| NARITA | NAHA | CHIBA | OKINAWA | AIRPLANE |
| NARITA | NAHA | CHIBA | OKINAWA | AIRPLANE |
| HANEDA | ITAMI | TOKYO | OSAKA | SHINKANSEN |
| HANEDA | KANSAI INTERNATIONAL | TOKYO | OSAKA | SHINKANSEN |
| HANEDA | ITAMI | TOKYO | OSAKA | SHINKANSEN |

AGGREGATED DATA

| No | PLACE OF DEPARTURE | PLACE OF ARRIVAL | PLACE OF DEPARTURE | PLACE OF ARRIVAL | MEANS OF TRANSPORTATION | AGGREGATION RESULT |
|---|---|---|---|---|---|---|
| 1 | HANEDA | HANEDA | HOKKAIDO | HOKKAIDO | AIRPLANE | 0 |
| 2 | HANEDA | HANEDA | HOKKAIDO | HOKKAIDO | SHINKANSEN | 0 |
| : | : | : | : | : | : | : |
| 30 | HANEDA | ITAMI | TOKYO | OSAKA | SHINKANSEN | 2 |
| 31 | HANEDA | KANSAI INTERNATIONAL | TOKYO | OSAKA | SHINKANSEN | 1 |
| : | : | : | : | : | : | : |
| 250 | NARITA | NAHA | CHIBA | OKINAWA | AIRPLANE | 2 |
| : | : | : | : | : | : | : |

Fig.20

AGGREGATED DATA USING FLAGGED LIST

| No | PLACE OF DEPARTURE | PLACE OF ARRIVAL | PLACE OF DEPARTURE | PLACE OF ARRIVAL | MEANS OF TRANSPORTATION | AGGREGATION RESULT |
|---|---|---|---|---|---|---|
| 1 | HANEDA | HANEDA | HOKKAIDO | HOKKAIDO | AIRPLANE | 0 |
| 2 | HANEDA | HANEDA | HOKKAIDO | HOKKAIDO | SHINKANSEN | 0 |
| : | : | : | : | : | : | : |
| 30 | HANEDA | ITAMI | TOKYO | OSAKA | SHINKANSEN | 2 |
| 31 | HANEDA | KANSAI INTERNATIONAL | TOKYO | OSAKA | SHINKANSEN | 1 |
| : | : | : | : | : | : | : |
| 250 | NARITA | NAHA | CHIBA | OKINAWA | AIRPLANE | 2 |
| : | : | : | : | : | : | : |

+

NOISE

| NOISE |
|---|
| 0 |
| 0 |
| : |
| 1 |
| 3 |
| : |
| 2 |
| : |

*Fig.21*

AGGREGATED DATA WITH NOISE ADDED (CIPHERTEXT)

| No | PLACE OF DEPARTURE | PLACE OF ARRIVAL | PLACE OF DEPARTURE | PLACE OF ARRIVAL | MEANS OF TRANSPORTATION | AGGREGATION RESULT |
|---|---|---|---|---|---|---|
| 1 | A HANEDA | A HANEDA | HOKKAIDO | HOKKAIDO | AIRPLANE | A 0 |
| 2 | A HANEDA | A HANEDA | HOKKAIDO | HOKKAIDO | SHINKANSEN | A 0 |
| : | : | : | : | : | : | : |
| 30 | A HANEDA | A ITAMI | TOKYO | OSAKA | SHINKANSEN | A 3 |
| 31 | A HANEDA | A KANSAI INTERNATIONAL | TOKYO | OSAKA | SHINKANSEN | A 4 |
| : | : | : | : | : | : | : |
| 250 | A NARITA | A NAHA | CHIBA | OKINAWA | AIRPLANE | A 4 |
| : | : | : | : | : | : | : |

DECRYPT

STATISTICAL INFORMATION (PLAIN TEXT)

| No | PLACE OF DEPARTURE | PLACE OF ARRIVAL | PLACE OF DEPARTURE | PLACE OF ARRIVAL | MEANS OF TRANSPORTATION | AGGREGATION RESULT |
|---|---|---|---|---|---|---|
| 1 | HANEDA | HANEDA | HOKKAIDO | HOKKAIDO | AIRPLANE | 0 |
| 2 | HANEDA | HANEDA | HOKKAIDO | HOKKAIDO | SHINKANSEN | 0 |
| : | : | : | : | : | : | : |
| 30 | HANEDA | ITAMI | TOKYO | OSAKA | SHINKANSEN | 3 |
| 31 | HANEDA | KANSAI INTERNATIONAL | TOKYO | OSAKA | SHINKANSEN | 4 |
| : | : | : | : | : | : | : |
| 250 | NARITA | NAHA | CHIBA | OKINAWA | AIRPLANE | 4 |
| : | : | : | : | : | : | : |

Fig.22

PATTERNS THAT BECOME STRUCTURAL ZEROS

| PATTERN | COMPANY A | | COMPANY B | | NUMBER OF PEOPLE |
|---|---|---|---|---|---|
| | PLACE OF DEPARTURE | PLACE OF ARRIVAL | PLACE OF DEPARTURE | PLACE OF ARRIVAL | |
| (1) | HANEDA AIRPORT | HANEDA AIRPORT | * | * | 0 |
| (2) | HANEDA AIRPORT | NARITA AIRPORT | * | * | 0 |
| (3) | HANEDA AIRPORT | * | * | HANEDA AIRPORT | 0 |
| (4) | HANEDA AIRPORT | * | * | TOKYO | 0 |

(1) ATTRIBUTE INFORMATION OF DATA OF COMPANY A (OR COMPANY B) IS SAME
(2) ATTRIBUTE INFORMATION OF DATA OF COMPANY A (OR COMPANY B) IS DIFFERENT, BUT COMBINATION DOES NOT EXIST
(3) ATTRIBUTE INFORMATION OF COMPANY A'S DATA AND ATTRIBUTE INFORMATION OF COMPANY B'S DATA ARE SAME
(4) ATTRIBUTE INFORMATION OF COMPANY A'S DATA AND ATTRIBUTE INFORMATION OF COMPANY B'S DATA ARE DIFFERENT, BUT COMBINATION DOES NOT EXIST

Fig.24

LIST IN WHICH STRUCTURED ZERO FLAG IS ASSIGNED (FLAGGED LIST)

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| 1 | HANEDA | HANEDA | HOKKAIDO | HOKKAIDO | AIRPLANE | | 1 |
| 2 | HANEDA | HANEDA | HOKKAIDO | HOKKAIDO | SHINKANSEN | | 1 |
| : | : | : | : | : | : | | : |
| 4 | NARITA | HANEDA | HOKKAIDO | AOMORI | AIRPLANE | | 1 |
| : | : | : | : | : | : | | : |

Fig.25

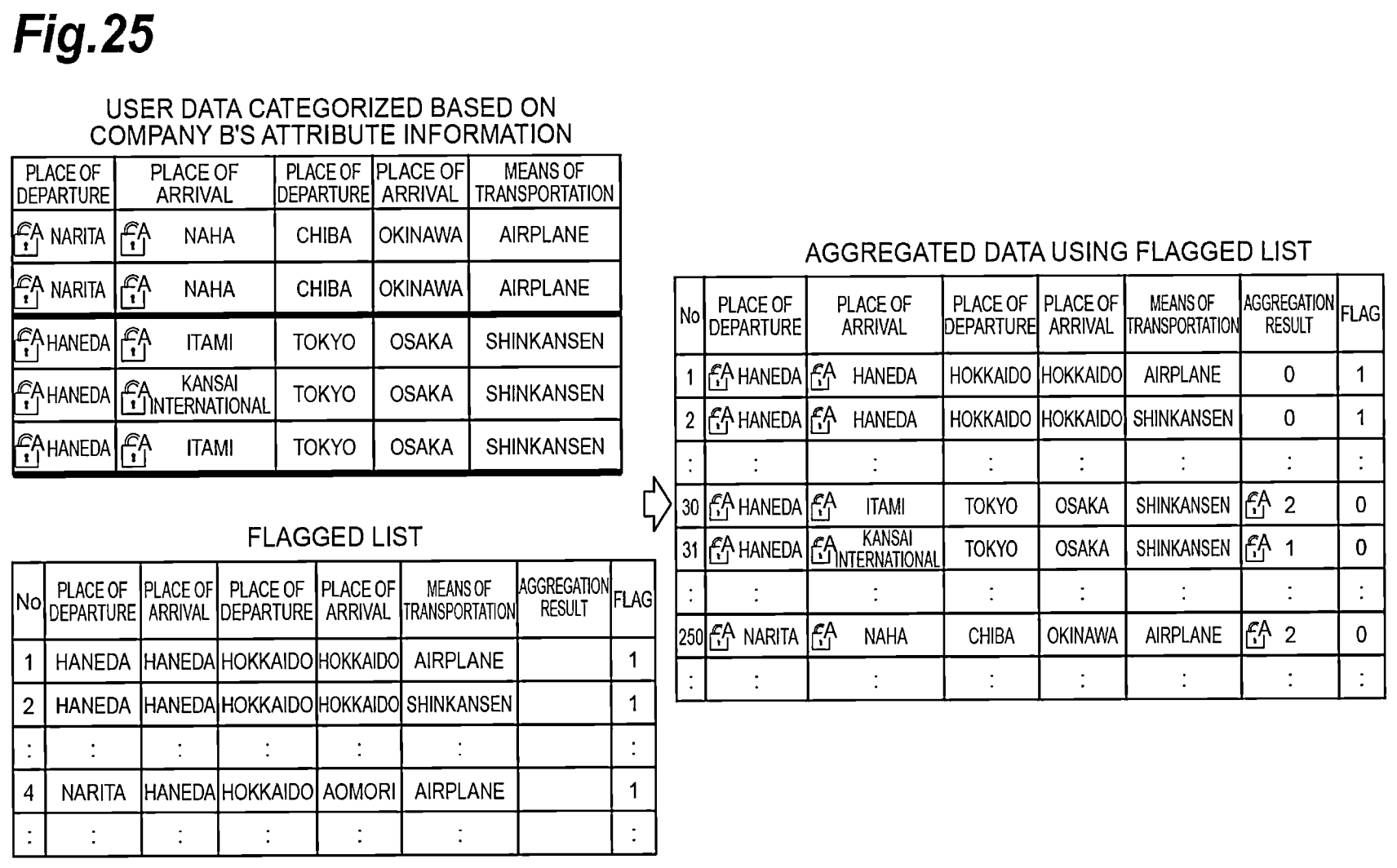

USER DATA CATEGORIZED BASED ON COMPANY B'S ATTRIBUTE INFORMATION

| PLACE OF DEPARTURE | PLACE OF ARRIVAL | PLACE OF DEPARTURE | PLACE OF ARRIVAL | MEANS OF TRANSPORTATION |
|---|---|---|---|---|
| NARITA | NAHA | CHIBA | OKINAWA | AIRPLANE |
| NARITA | NAHA | CHIBA | OKINAWA | AIRPLANE |
| HANEDA | ITAMI | TOKYO | OSAKA | SHINKANSEN |
| HANEDA | KANSAI INTERNATIONAL | TOKYO | OSAKA | SHINKANSEN |
| HANEDA | ITAMI | TOKYO | OSAKA | SHINKANSEN |

FLAGGED LIST

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| 1 | HANEDA | HANEDA | HOKKAIDO | HOKKAIDO | AIRPLANE | | 1 |
| 2 | HANEDA | HANEDA | HOKKAIDO | HOKKAIDO | SHINKANSEN | | 1 |
| : | : | : | : | : | : | | : |
| 4 | NARITA | HANEDA | HOKKAIDO | AOMORI | AIRPLANE | | 1 |
| : | : | : | : | : | : | | : |

AGGREGATED DATA USING FLAGGED LIST

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| 1 | HANEDA | HANEDA | HOKKAIDO | HOKKAIDO | AIRPLANE | 0 | 1 |
| 2 | HANEDA | HANEDA | HOKKAIDO | HOKKAIDO | SHINKANSEN | 0 | 1 |
| : | : | : | : | : | : | : | : |
| 30 | HANEDA | ITAMI | TOKYO | OSAKA | SHINKANSEN | 2 | 0 |
| 31 | HANEDA | KANSAI INTERNATIONAL | TOKYO | OSAKA | SHINKANSEN | 1 | 0 |
| : | : | : | : | : | : | : | : |
| 250 | NARITA | NAHA | CHIBA | OKINAWA | AIRPLANE | 2 | 0 |
| : | : | : | : | : | : | : | : |

*Fig.26*

AGGREGATED DATA USING FLAGGED LIST

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| 1 | HANEDA | HANEDA | HOKKAIDO | HOKKAIDO | AIRPLANE | 0 | 1 |
| 2 | HANEDA | HANEDA | HOKKAIDO | HOKKAIDO | SHINKANSEN | 0 | 1 |
| : | : | : | : | : | : | : | : |
| 30 | HANEDA | ITAMI | TOKYO | OSAKA | SHINKANSEN | 2 | 0 |
| 31 | HANEDA | KANSAI INTERNATIONAL | TOKYO | OSAKA | SHINKANSEN | 1 | 0 |
| : | : | : | : | : | : | : | : |
| 250 | NARITA | NAHA | CHIBA | OKINAWA | AIRPLANE | 2 | 0 |
| : | : | : | : | : | : | : | : |

+

NOISE

| NOISE |
|---|
| 0 |
| 0 |
| : |
| 1 |
| 3 |
| : |
| 2 |
| : |

NOISE IS NOT ADDED

Fig.27

AGGREGATED DATA WITH NOISE ADDED (CIPHERTEXT)

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| 1 | HANEDA | HANEDA | HOKKAIDO | HOKKAIDO | AIRPLANE | 0 | 1 |
| 2 | HANEDA | HANEDA | HOKKAIDO | HOKKAIDO | SHINKANSEN | 0 | 1 |
| : | : | : | : | : | : | : | : |
| 30 | HANEDA | ITAMI | TOKYO | OSAKA | SHINKANSEN | 3 | 0 |
| 31 | HANEDA | KANSAI INTERNATIONAL | TOKYO | OSAKA | SHINKANSEN | 4 | 0 |
| : | : | : | : | : | : | : | : |
| 250 | NARITA | NAHA | CHIBA | OKINAWA | AIRPLANE | 4 | 0 |
| : | : | : | : | : | : | : | : |

DECRYPT

STATISTICAL INFORMATION (PLAIN TEXT)

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| 1 | HANEDA | HANEDA | HOKKAIDO | HOKKAIDO | AIRPLANE | 0 | 1 |
| 2 | HANEDA | HANEDA | HOKKAIDO | HOKKAIDO | SHINKANSEN | 0 | 1 |
| : | : | : | : | : | : | : | : |
| 30 | HANEDA | ITAMI | TOKYO | OSAKA | SHINKANSEN | 3 | 0 |
| 31 | HANEDA | KANSAI INTERNATIONAL | TOKYO | OSAKA | SHINKANSEN | 4 | 0 |
| : | : | : | : | : | : | : | : |
| 250 | NARITA | NAHA | CHIBA | OKINAWA | AIRPLANE | 4 | 0 |
| : | : | : | : | : | : | : | : |

Fig.29

USER DATA CATEGORIZED BASED ON COMPANY B'S ATTRIBUTE INFORMATION

| PLACE OF DEPARTURE | PLACE OF ARRIVAL | PLACE OF DEPARTURE | PLACE OF ARRIVAL | MEANS OF TRANSPORTATION |
|---|---|---|---|---|
| NARITA | NAHA | CHIBA | OKINAWA | AIRPLANE |
| NARITA | NAHA | CHIBA | OKINAWA | AIRPLANE |
| HANEDA | ITAMI | TOKYO | OSAKA | SHINKANSEN |
| HANEDA | KANSAI INTERNATIONAL | TOKYO | OSAKA | SHINKANSEN |
| HANEDA | ITAMI | TOKYO | OSAKA | SHINKANSEN |

FLAGGED LIST

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| 1 | HANEDA | HANEDA | HOKKAIDO | HOKKAIDO | AIRPLANE | | 1 |
| 2 | HANEDA | HANEDA | HOKKAIDO | HOKKAIDO | SHINKANSEN | | 1 |
| : | : | : | : | : | : | | : |
| 4 | NARITA | HANEDA | HOKKAIDO | AOMORI | AIRPLANE | | 1 |
| : | : | : | : | : | : | | : |

AGGREGATED DATA (FLAGGED DATA IS EXCLUDED FROM AGGREGATION TARGETS)

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| ~~1~~ | ~~HANEDA~~ | ~~HANEDA~~ | ~~HOKKAIDO~~ | ~~HOKKAIDO~~ | ~~AIRPLANE~~ | ~~0~~ | ~~1~~ |
| ~~2~~ | ~~HANEDA~~ | ~~HANEDA~~ | ~~HOKKAIDO~~ | ~~HOKKAIDO~~ | ~~SHINKANSEN~~ | ~~0~~ | ~~1~~ |
| : | : | : | : | : | : | : | : |
| 30 | HANEDA | ITAMI | TOKYO | OSAKA | SHINKANSEN | 2 | 0 |
| 31 | HANEDA | KANSAI INTERNATIONAL | TOKYO | OSAKA | SHINKANSEN | 1 | 0 |
| : | : | : | : | : | : | : | : |
| 250 | NARITA | NAHA | CHIBA | OKINAWA | AIRPLANE | 2 | 0 |
| : | : | : | : | : | : | : | : |

Fig.30

AGGREGATED DATA USING FLAGGED LIST

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| ~~1~~ | ~~HANEDA~~ | ~~HANEDA~~ | ~~HOKKAIDO~~ | ~~HOKKAIDO~~ | ~~AIRPLANE~~ | ~~0~~ | ~~1~~ |
| ~~2~~ | ~~HANEDA~~ | ~~HANEDA~~ | ~~HOKKAIDO~~ | ~~HOKKAIDO~~ | ~~SHINKANSEN~~ | ~~0~~ | ~~1~~ |
| : | : | : | : | : | : | : | : |
| 30 | HANEDA | ITAMI | TOKYO | OSAKA | SHINKANSEN | 2 | 0 |
| 31 | HANEDA | KANSAI INTERNATIONAL | TOKYO | OSAKA | SHINKANSEN | 1 | 0 |
| : | : | : | : | : | : | : | : |
| 250 | NARITA | NAHA | CHIBA | OKINAWA | AIRPLANE | 2 | 0 |
| : | : | : | : | : | : | : | : |

+

NOISE

| NOISE |
|---|
| ~~0~~ |
| ~~0~~ |
| : |
| 1 |
| 3 |
| : |
| 2 |
| : |

NOISE IS NOT ADDED

Fig.31

AGGREGATED DATA WITH NOISE ADDED (CIPHERTEXT)

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| ~~1~~ | ~~HANEDA~~ | ~~HANEDA~~ | ~~HOKKAIDO~~ | ~~HOKKAIDO~~ | ~~AIRPLANE~~ | ~~0~~ | ~~1~~ |
| ~~2~~ | ~~HANEDA~~ | ~~HANEDA~~ | ~~HOKKAIDO~~ | ~~HOKKAIDO~~ | ~~SHINKANSEN~~ | ~~0~~ | ~~1~~ |
| : | : | : | : | : | : | : | : |
| 30 | HANEDA | ITAMI | TOKYO | OSAKA | SHINKANSEN | 3 | 0 |
| 31 | HANEDA | KANSAI INTERNATIONAL | TOKYO | OSAKA | SHINKANSEN | 4 | 0 |
| : | : | : | : | : | : | : | : |
| 250 | NARITA | NAHA | CHIBA | OKINAWA | AIRPLANE | 4 | 0 |
| : | : | : | : | : | : | : | : |

DECRYPT

STATISTICAL INFORMATION (PLAIN TEXT)

| No | PLACE OF DEPARTURE | PLACE OF ARRIVAL | PLACE OF DEPARTURE | PLACE OF ARRIVAL | MEANS OF TRANSPORTATION | AGGREGATION RESULT | FLAG |
|---|---|---|---|---|---|---|---|
| ~~1~~ | ~~HANEDA~~ | ~~HANEDA~~ | ~~HOKKAIDO~~ | ~~HOKKAIDO~~ | ~~AIRPLANE~~ | ~~0~~ | ~~1~~ |
| ~~2~~ | ~~HANEDA~~ | ~~HANEDA~~ | ~~HOKKAIDO~~ | ~~HOKKAIDO~~ | ~~SHINKANSEN~~ | ~~0~~ | ~~1~~ |
| : | : | : | : | : | : | : | : |
| 30 | HANEDA | ITAMI | TOKYO | OSAKA | SHINKANSEN | 3 | 0 |
| 31 | HANEDA | KANSAI INTERNATIONAL | TOKYO | OSAKA | SHINKANSEN | 4 | 0 |
| : | : | : | : | : | : | : | : |
| 250 | NARITA | NAHA | CHIBA | OKINAWA | AIRPLANE | 4 | 0 |
| : | : | : | : | : | : | : | : |

*Fig.33*

USER DATA CATEGORIZED BASED ON COMPANY B'S ATTRIBUTE INFORMATION

| PLACE OF DEPARTURE | PLACE OF ARRIVAL | PLACE OF DEPARTURE | PLACE OF ARRIVAL | MEANS OF TRANSPORTATION |
|---|---|---|---|---|
| A NARITA | A NAHA | CHIBA | OKINAWA | AIRPLANE |
| A NARITA | A NAHA | CHIBA | OKINAWA | AIRPLANE |
| A HANEDA | A ITAMI | TOKYO | OSAKA | SHINKANSEN |
| A HANEDA | A KANSAI INTERNATIONAL | TOKYO | OSAKA | SHINKANSEN |
| A HANEDA | A ITAMI | TOKYO | OSAKA | SHINKANSEN |

AGGREGATION TARGET LIST

| PLACE OF DEPARTURE | PLACE OF ARRIVAL | PLACE OF DEPARTURE | PLACE OF ARRIVAL | MEANS OF TRANSPORTATION |
|---|---|---|---|---|
| HANEDA | ITAMI | TOKYO | OSAKA | SHINKANSEN |
| HANEDA | KANSAI INTERNATIONAL | TOKYO | OSAKA | SHINKANSEN |
| : | : | : | : | : |
| NARITA | NAHA | CHIBA | OKINAWA | AIRPLANE |
| : | : | : | : | : |

AGGREGATED DATA

| PLACE OF DEPARTURE | PLACE OF ARRIVAL | PLACE OF DEPARTURE | PLACE OF ARRIVAL | MEANS OF TRANSPORTATION | AGGREGATION RESULT |
|---|---|---|---|---|---|
| HANEDA | ITAMI | TOKYO | OSAKA | SHINKANSEN | 2 |
| HANEDA | KANSAI INTERNATIONAL | TOKYO | OSAKA | SHINKANSEN | 1 |
| : | : | : | : | : | : |
| NARITA | NAHA | CHIBA | OKINAWA | AIRPLANE | 2 |
| : | : | : | : | : | : |

PRIVACY-PROTECTED DATA AGGREGATION DEVICE AND PRIVACY-PROTECTED DATA AGGREGATION SYSTEM

TECHNICAL FIELD

The present disclosure relates to a privacy-protected data aggregation device and a privacy-protected data aggregation system.

BACKGROUND ART

It is widely demanded by society to perform aggregation processing while protecting personal information in a database. Such a technology is disclosed in, for example, Patent Literature 1. In addition, differential privacy is known as a technology that enables statistical analysis while protecting personal information in a database from attackers. In data aggregation technology related to differential privacy, the concepts of "structured zero" and "unstructured zero" when counting a number of users corresponding to a combination of a plurality of pieces of attribute information are known. Of these, "structured zero" means that the output (aggregation result) is "0" due to a combination that does not exist structurally, and "unstructured zero" means that the aggregation result is not output even though the combination exists structurally.

CITATION LIST

Patent Literature

Patent Literature 1: Japanese Unexamined Patent Publication No. 2010-108488

SUMMARY OF INVENTION

Technical Problem

Considering a case where individual-form data is aggregated using secure computation and anonymization processing is performed on the aggregation result, if data of a combination of attribute information that structurally exists does not actually exist in the individual-form data, the aggregation result is not output because the combination is not an aggregation target. As a result, there is a problem that a third party becomes aware that the data of the combination does not exist in the individual-form data. That is, since the data of the combination corresponds to the unstructured zero described above, unintended disclosure due to the unstructured zero occurs.

However, Patent Literature 1 does not disclose any measures to prevent the above-described unintended disclosure due to unstructured zeros, and accordingly, such preventive measures have been demanded.

The present disclosure has been made to solve the aforementioned problem, and it is an object of the present disclosure to prevent unintended disclosure due to unstructured zeros.

Solution to Problem

A privacy-protected data aggregation device according to the present disclosure includes: an attribute information encryption unit that encrypts attribute information in user data to be aggregated, which includes a plurality of pieces of attribute information, using a homomorphic encryption method that enables aggregation processing; an aggregation processing unit that aggregates user data with attribute information encrypted by the attribute information encryption unit, for all combinations of possible values of the plurality of pieces of attribute information in domain data that defines possible values of each of the pieces of attribute information included in the user data, to obtain aggregated data including an aggregation result and encrypted attribute information; an anonymization processing unit that performs anonymization processing on the aggregated data obtained by the aggregation processing unit; and a decryption unit that decrypts aggregated data subjected to the anonymization processing to obtain aggregated data including an aggregation result after the anonymization processing and decrypted attribute information.

In the privacy-protected data aggregation device described above, the attribute information encryption unit encrypts attribute information in the user data to be aggregated, which includes a plurality of pieces of attribute information, using a homomorphic encryption method that enables aggregation processing, and the aggregation processing unit aggregates user data with encrypted attribute information, for all combinations of possible values of the plurality of pieces of attribute information in the domain data, to obtain aggregated data including an aggregation result and encrypted attribute information. In this manner, all possible combinations of values of a plurality of attribute information in the domain data are aggregated, and totaled data including the aggregation results and encrypted attribute information is obtained. Then, the anonymization processing unit performs anonymization processing on the aggregated data obtained by the aggregation processing unit, so that the aggregated data is anonymized, and the decryption unit decrypts aggregated data subjected to the anonymization processing to obtain aggregated data including an aggregation result after the anonymization processing and decrypted attribute information. In this manner, the aggregation result after the anonymization processing can be output in a format that can be checked by the user. In the series of processes described above, aggregation is performed for all combinations of the possible values of a plurality of pieces of attribute information in the domain data. Therefore, since it is possible to avoid a situation in which unstructured zeros (that is, combinations that exist structurally but are not output) occur, it is possible to prevent unintended disclosure due to unstructured zeros.

Advantageous Effects of Invention

According to the present disclosure, it is possible to prevent unintended disclosure due to unstructured zeros.

BRIEF DESCRIPTION OF DRAWINGS

FIG. 9 is a diagram for explaining the process in the fourth embodiment.

FIG. 12(*a*) is a diagram showing an example of user data and domain data of a company A, and FIG. 12(*b*) is a diagram showing an example of user data and domain data of a company B.

FIG. 13 is a diagram showing an aggregation image.

FIG. 18 is a diagram showing the categorization of matched data by the company B.

FIG. 19 is a diagram showing aggregation processing by the company B.

FIG. 20 is a diagram showing anonymization processing by the company B.

FIG. 21 is a diagram showing decryption processing by the company A.

FIG. 22 is a diagram for explaining patterns that result in structured zeros.

FIG. 24 is a diagram showing an example of a list with a structured zero flag (flagged list).

FIG. 25 is a diagram showing aggregation processing by the company B in the sixth embodiment.

FIG. 26 is a diagram showing anonymization processing by the company B in the sixth embodiment.

FIG. 27 is a diagram showing decryption processing by the company A in the sixth embodiment.

FIG. 29 is a diagram showing aggregation processing by the company B in the seventh embodiment.

FIG. 30 is a diagram showing anonymization processing by the company B in the seventh embodiment.

FIG. 31 is a diagram showing decryption processing by the company A in the seventh embodiment.

FIG. 33 is a diagram showing aggregation processing by the company B in the eighth embodiment.

DESCRIPTION OF EMBODIMENTS

Hereinafter, first to eighth embodiments of the present disclosure will be described in order with reference to the diagrams. Among these, in the first embodiment, a form of preventing unintended disclosure due to unstructured zeros in a privacy-protected data aggregation device will be described, and in the second to fourth embodiments, three forms of preventing unintended disclosure due to structured zero in the privacy-protected data aggregation device according to the first embodiment will be described. In the fifth embodiment, a form of preventing unintended disclosure due to unstructured zeros by cooperation between first and second devices included in a privacy-protected data aggregation system will be described, and in the sixth to eighth embodiments, three forms of further preventing unintended disclosure due to structured zero in the privacy-protected data aggregation system according to the fifth embodiment will be described.

First Embodiment

In the first embodiment, focusing on preventing unintended disclosure due to unstructured zeros, a form of preventing unintended disclosure due to unstructured zeros in a single privacy-protected data aggregation device will be described.

Figure 1:
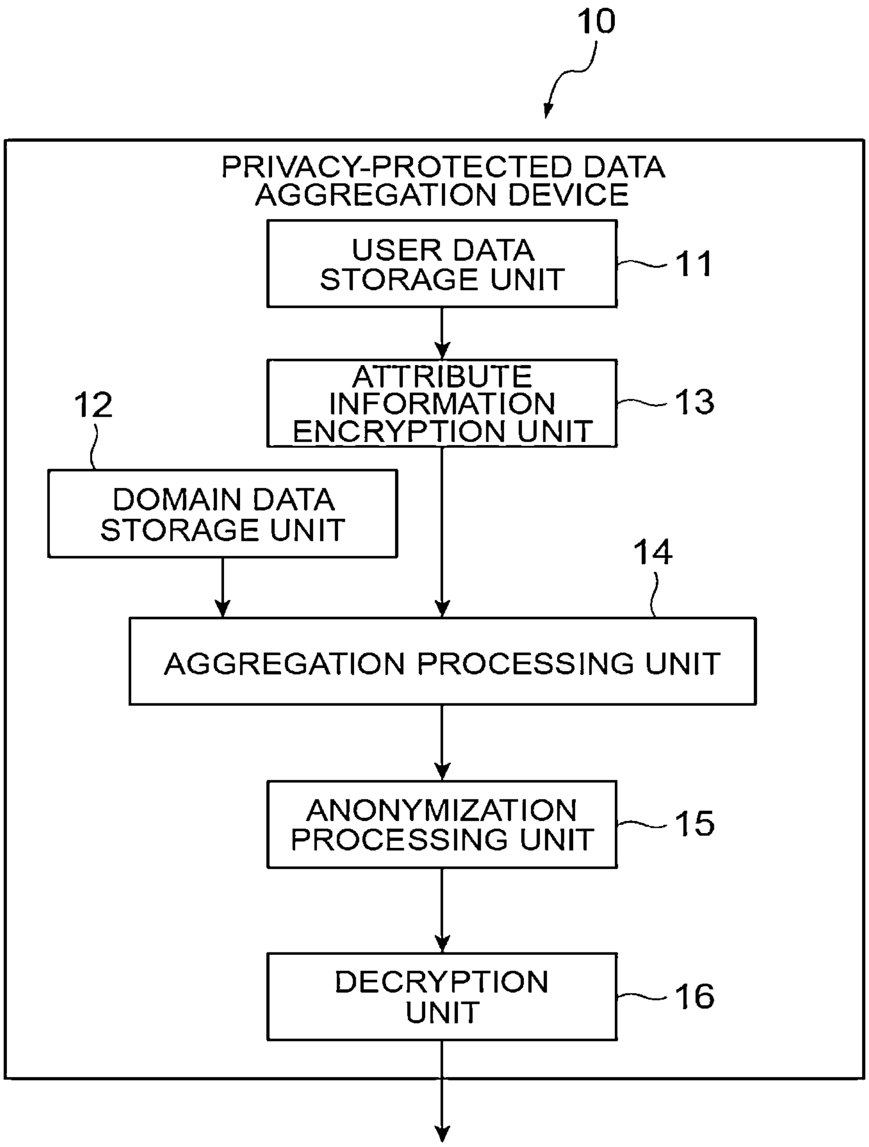
FIG. 1 is a functional block diagram of a privacy-protected data aggregation device according to each of first to fourth embodiments.

As shown in FIG. 1, a privacy-protected data aggregation device 10 according to the first embodiment includes, as functional blocks, a user data storage unit 11, a domain data storage unit 12, an attribute information encryption unit 13, an aggregation processing unit 14, an anonymization processing unit 15, and a decryption unit 16. Hereinafter, an overview of each functional unit will be given.

Figure 3:
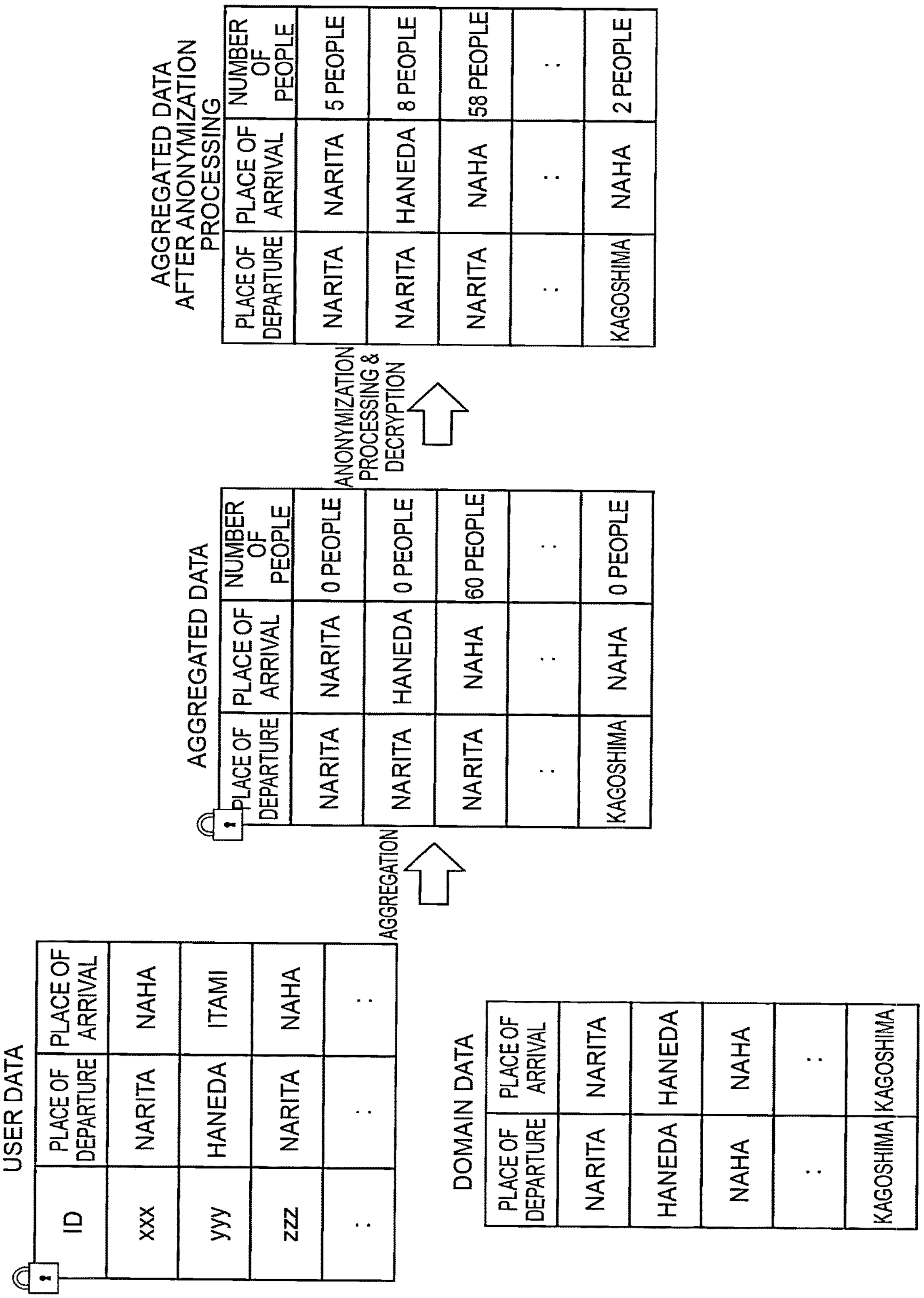
FIG. 3 is a diagram for explaining the process in the first embodiment.

The user data storage unit 11 is a functional unit that stores user data to be aggregated, including a plurality of pieces of attribute information, and stores user data such as ID, place of departure, and place of arrival, for example, as "user data" shown in FIG. 3.

The domain data storage unit 12 is a functional unit that stores domain data that defines the possible values of each piece of attribute information included in the user data, and stores domain data indicating the possible values (Narita, Haneda, Naha, . . . , Kagoshima) of "place of departure" and the possible values (Narita, Haneda, Naha, . . . , Kagoshima) of "place of arrival", for example, as "domain data" shown in FIG. 3.

In addition, in the present embodiment, an example will be described in which user data and domain data are stored in advance in the privacy-protected data aggregation device 10. However, these pieces of data may also be input to the privacy-protected data aggregation device 10 from an external device. In this case, the user data storage unit 11 and the domain data storage unit 12 are not components of the privacy-protected data aggregation device 10.

The attribute information encryption unit 13 is a functional unit that encrypts attribute information in the user data to be aggregated, which includes a plurality of pieces of attribute information, using a homomorphic encryption method that enables aggregation processing. As a homomorphic encryption method that enables aggregation processing, for example, an encryption method having additive homomorphism or complete homomorphism can be adopted.

The aggregation processing unit 14 is a functional unit that aggregates user data with attribute information encrypted by the attribute information encryption unit 13, for all combinations of possible values of a plurality of pieces of attribute information in the above-described domain data, to obtain aggregated data including the aggregation result and the encrypted attribute information.

The anonymization processing unit 15 is a functional unit that performs anonymization processing on the aggregated data obtained by the aggregation processing unit 14.

The decryption unit 16 is a functional unit that decrypts the aggregated data subjected to the anonymization processing to obtain aggregated data that includes the aggregation result after the anonymization processing and the decrypted attribute information, and the decryption unit 16 outputs the obtained aggregated data.

Figure 2:
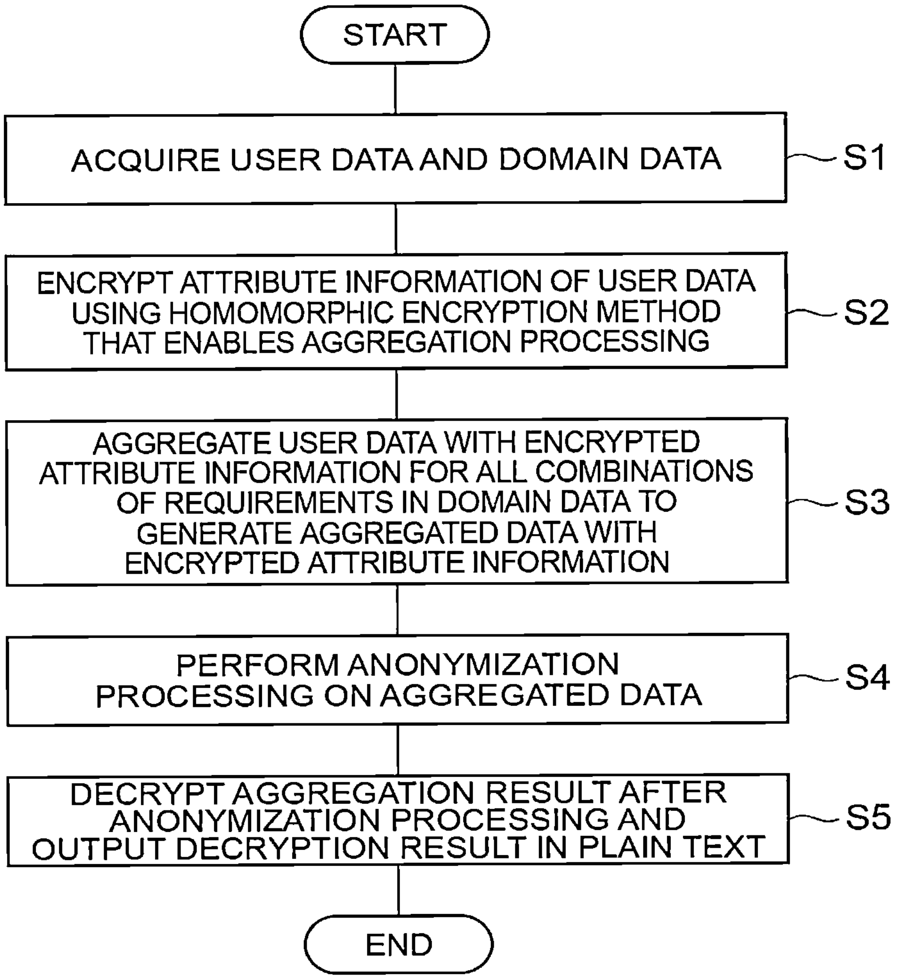
FIG. 2 is a flow chart showing a process in the first embodiment.

In the privacy-protected data aggregation device 10 including the functional blocks described above, a process shown in FIG. 2 is performed.

First, user data stored in the user data storage unit 11 and domain data stored in the domain data storage unit 12 are read and acquired so that these can be executed in subsequent processing (step S1). In addition, as described above, these pieces of data may be acquired by being input (received) from an external device.

Then, the attribute information encryption unit 13 encrypts the attribute information of the user data using a homomorphic encryption method that enables aggregation processing (for example, an encryption method having additive homomorphism or complete homomorphism) (step S2).

Then, the aggregation processing unit 14 aggregates the user data with the encrypted attribute information for all combinations of requirements in the domain data to generate aggregated data with the encrypted attribute information (step S3). In this manner, as shown in "aggregated data" in FIG. 3, aggregated data including the aggregation result (the number of people) with encrypted attribute information (place of departure, place of arrival) is generated. At this time, since user data is aggregated for all combinations of requirements in the domain data, all combinations that exist structurally are aggregation targets without omission even if these do not exist in the user data. For example, user data for the combination of place of departure "Kagoshima" and place of arrival "Naha" does not exist in the user data and the aggregation result (the number of people) is "0 people", but the user data for the combination of place of departure "Kagoshima" and place of arrival "Naha" is not omitted from the aggregated data and is included in the aggregated data as an aggregation result of "0 people". That is, it is possible to avoid a situation in which unstructured zeros (combinations that exist structurally but are not output) occur.

Then, the anonymization processing unit 15 performs anonymization processing on the above-described aggregated data (step S4), and the decryption unit 16 decrypts the aggregation result after anonymization processing to obtain aggregated data including the aggregation result after anonymization processing and the decrypted attribute information, and outputs the aggregated data in plain text (step S5). In this manner, as shown in "aggregated data after anonymization processing" in FIG. 3, aggregated data in which the attribute information (place of departure, place of arrival) has been decrypted and the aggregation result (the number of people) has been subjected to anonymization processing is obtained and output. As a result, although the user data for the combination of place of departure "Kagoshima" and place of arrival "Naha" does not exist in the user data and the aggregation result (the number of people) is "0 people", the user data for the combination of place of departure "Kagoshima" and place of arrival "Naha" is included as an aggregation result of "0 people" in the aggregated data before the anonymization processing and is included as an aggregation result of "2 people" in the aggregated data after the anonymization processing.

As described above, according to the first embodiment, it is possible to avoid a situation in which unstructured zeros (combinations that exist structurally but are not output) occur. As a result, it is possible to prevent unintended disclosure due to unstructured zeros.

Second Embodiment

In the second embodiment, in addition to the first embodiment in which unintended disclosure due to unstructured zeros is prevented, a form of preventing a situation, in which the aggregation results of structured zero combinations become non-zero values and the usefulness of the aggregation results (statistical information) is lowered, by excluding the structured zero combinations from anonymization processing targets and fixing the aggregation results to zero will be further described.

Since the functional block configuration of the privacy-protected data aggregation device 10 according to the second embodiment is the same as the above configuration shown in FIG. 1, repeated descriptions thereof will be omitted. However, among the functional units in FIG. 1, the anonymization processing unit 15 has a feature of fixing the aggregation result of a flagged combination in the aggregated data to zero and performing anonymization processing on an unflagged combination in the aggregated data by referring to a flagged list in which non-existent combinations, among all combinations of the possible values of a plurality of pieces of attribute information in the domain data, are flagged.

For example, the above-described "flagged list" may be generated in advance and stored in the domain data storage unit 12, or may be generated from the domain data at that time by the domain data storage unit 12 as described below.

Figure 4:
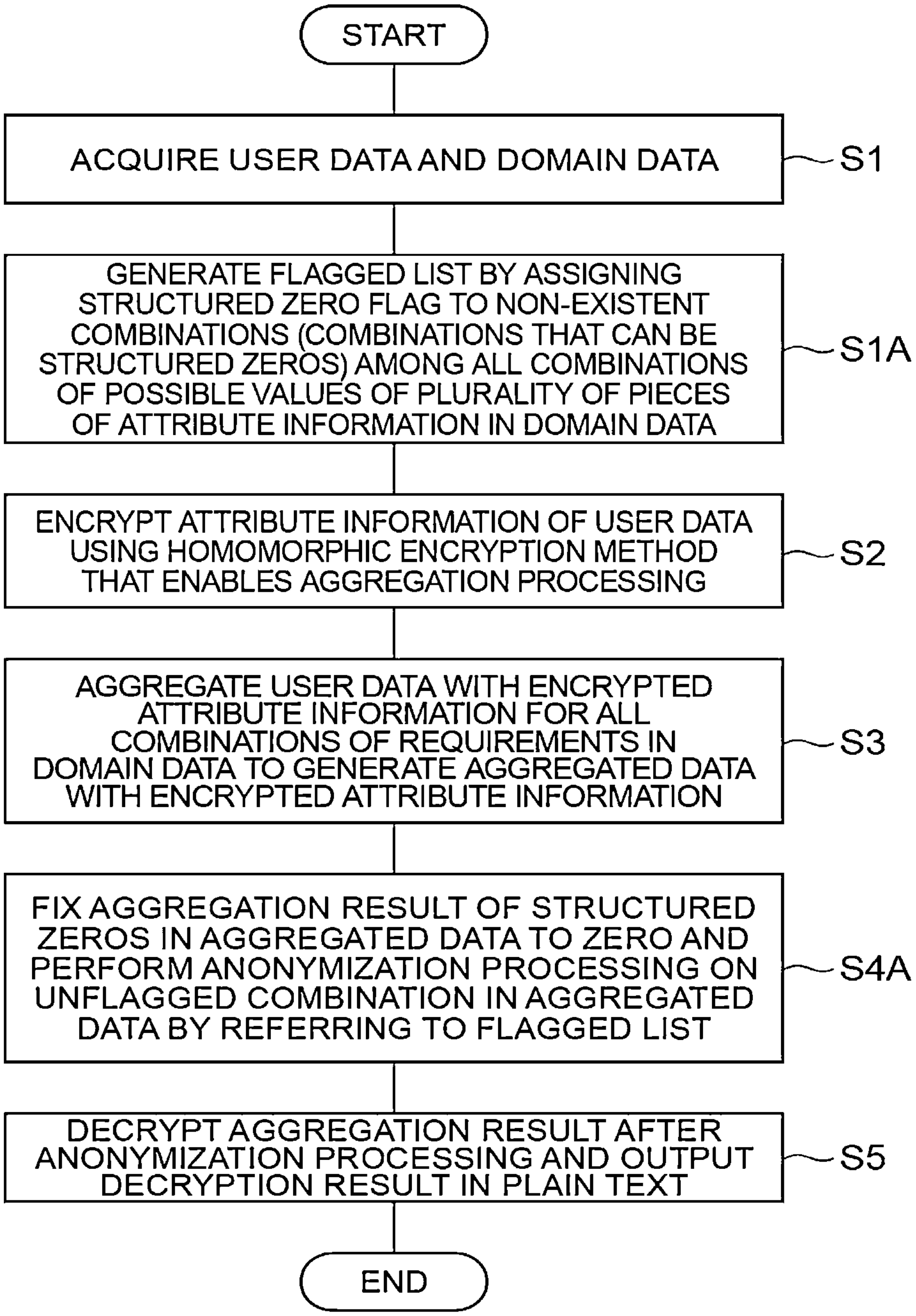
FIG. 4 is a flowchart showing a process in a second embodiment.

In the privacy-protected data aggregation device 10 according to the second embodiment, a process shown in FIG. 4 is performed. In addition, in FIG. 4, the same step numbers are given to the same processes as those in the first embodiment (FIG. 2), and detailed descriptions thereof will be omitted.

Figure 5:
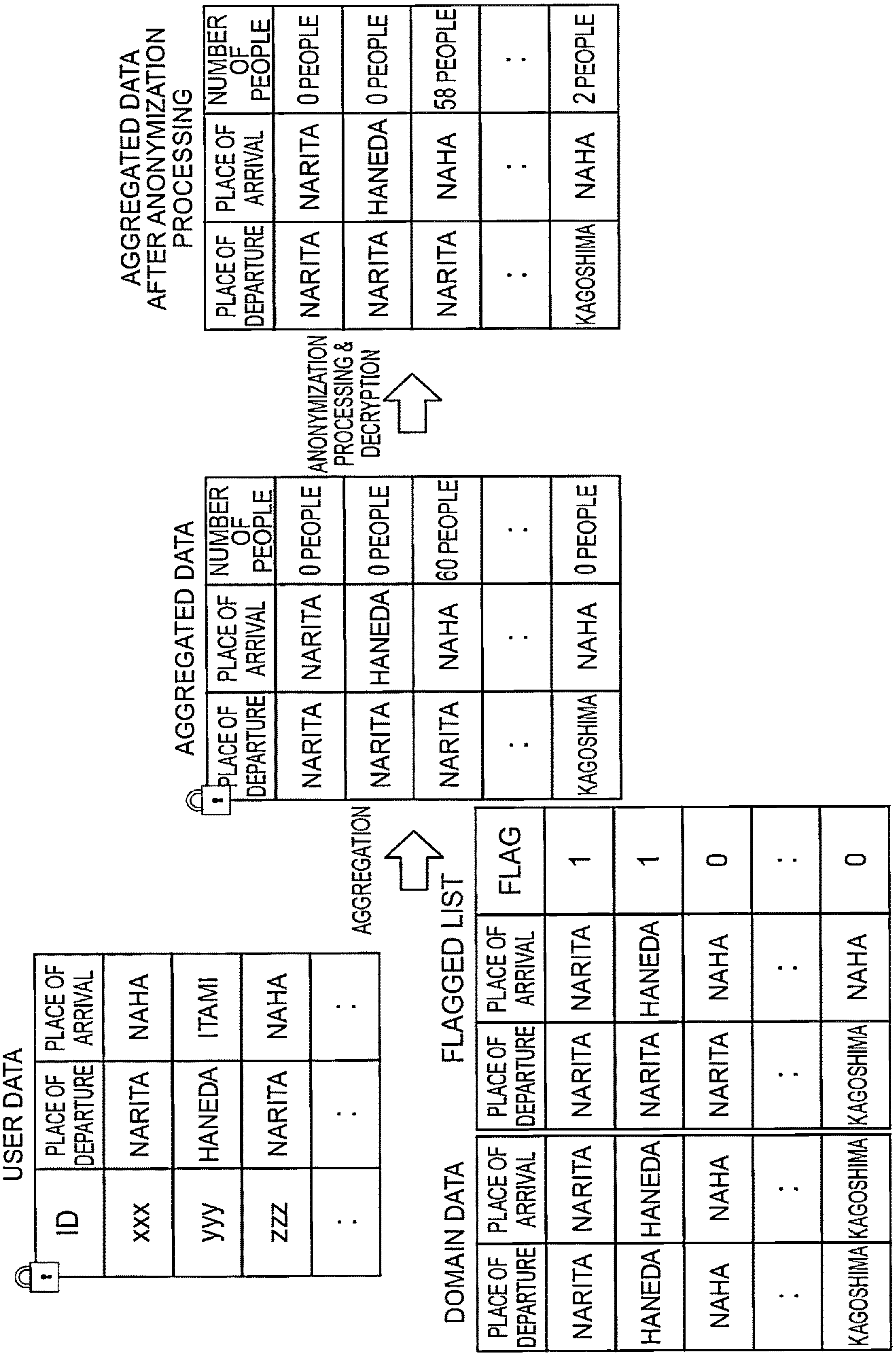
FIG. 5 is a diagram for explaining the process in the second embodiment.

First, user data stored in the user data storage unit 11 and domain data stored in the domain data storage unit 12 are acquired so that these can be executed in subsequent processing (step S1). Then, the domain data storage unit 12 generates the above-described "flagged list" by assigning a structured zero flag to non-existent combinations (combinations that can be structured zeros) among all combinations of the possible values of a plurality of pieces of attribute information in the domain data at that time (step S1A). For example, as shown in the "flagged list" in FIG. 5, a structured zero flag "1" is assigned to a combination of place of departure "Narita" and place of arrival "Narita", which does not exist, and similarly, a structured zero flag "1" is assigned to a combination of place of departure "Narita" and place of arrival "Haneda", which does not exist. For existent combinations (for example, a combination of place of departure "Narita" and place of arrival "Naha"), the flag is set to "0". Such a flagged list is transmitted from the domain data storage unit 12 to the anonymization processing unit 15 through the aggregation processing unit 14.

Thereafter, as in the first embodiment, the attribute information encryption unit 13 encrypts the attribute information of the user data using a homomorphic encryption method that enables aggregation processing (for example, an encryption method having additive homomorphism or complete homomorphism) (step S2), and the aggregation processing unit 14 aggregates the user data with the encrypted attribute information for all combinations of requirements in the domain data to generate aggregated data with the encrypted attribute information (step S3). In this manner, as shown in "aggregated data" in FIG. 5, aggregated data including the aggregation result (the number of people) with encrypted attribute information (place of departure, place of arrival) is generated. At this time, since user data is aggregated for all combinations of requirements in the domain data, all combinations that exist structurally are aggregation targets without omission even if these do not exist in the user data. Therefore, as in the first embodiment, it is possible to avoid a situation in which unstructured zeros (combinations that exist structurally but are not output) occur.

Then, the anonymization processing unit 15 fixes the aggregation result of a flagged combination in the aggregated data to zero and performs anonymization processing on an unflagged combination in the aggregated data by referring to the flagged list (step S4A). Therefore, it is possible to prevent a situation in which the aggregation results of flagged non-existent combinations (combinations that can be structured zeros) become non-zero values by anonymization processing and the usefulness of the aggregation results (statistical information) is lowered.

Thereafter, the decryption unit 16 decrypts the aggregation result after step S4A, in which non-existent combinations are fixed to zero, to obtain aggregated data including the aggregation result after anonymization processing and the decrypted attribute information, and outputs the aggregated data in plain text (step S5). In this manner, as shown in "aggregated data after anonymization processing" in FIG. 5, aggregated data in which the attribute information (place of departure, place of arrival) has been decrypted and the aggregation result (the number of people) has been subjected to anonymization processing is obtained and output.

According to the second embodiment described above, the aggregation results (the number of people) of non-existent combinations that can be structured zeros (for example, a combination of place of departure "Narita" and place of arrival "Narita" and a combination of place of departure "Narita" and place of arrival "Haneda") are fixed to zero and output. Therefore, it is possible to prevent a situation in which the aggregation results of non-existent combinations become non-zero values by anonymization processing and the usefulness of the aggregation results (statistical information) is lowered. In addition, as in the first embodiment, since all combinations that exist structurally are aggregation targets without omission even if these do not exist in the user data, it is possible to avoid a situation in which unstructured zeros (combinations that exist structurally but are not output) occur. As a result, it is possible to prevent unintended disclosure due to unstructured zeros.

Third Embodiment

In the third embodiment, in addition to the first embodiment in which unintended disclosure due to unstructured zeros is prevented, a form of preventing a situation, in which the aggregation results of structured zero combinations become non-zero values by subsequent anonymization processing and the usefulness of the aggregation results (statistical information) is lowered, by excluding the structured zero combinations from aggregation processing targets so as not to be included in aggregated data.

Since the functional block configuration of the privacy-protected data aggregation device 10 according to the third embodiment is the same as the above configuration shown in FIG. 1, repeated descriptions thereof will be omitted. However, among the functional units in FIG. 1, the aggregation processing unit 14 has a feature of aggregating the above user data for combinations that are not flagged, among all the above combinations, by referring to a flagged list in which non-existent combinations among all combinations of the possible values of a plurality of pieces of attribute information in the domain data are flagged.

For example, the above-described "flagged list" may be generated in advance and stored in the domain data storage unit 12, or may be generated from the domain data at that time by the domain data storage unit 12 as described below.

Figure 6:
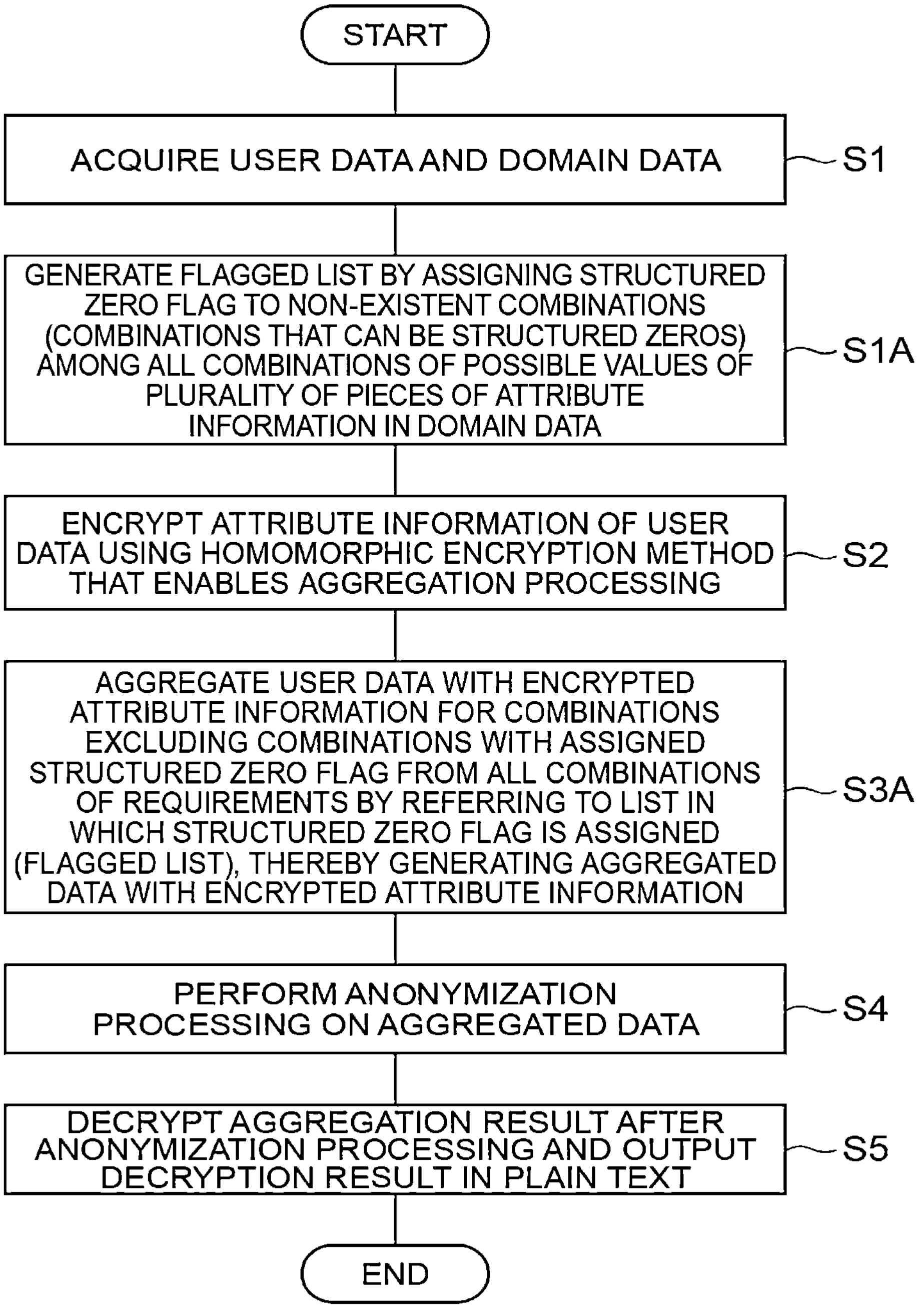
FIG. 6 is a flowchart showing a process in a third embodiment.

In the privacy-protected data aggregation device 10 according to the third embodiment, a process shown in FIG. 6 is performed. In addition, in FIG. 6, the same step numbers are given to the same processes as those in the first embodiment (FIG. 2), and detailed descriptions thereof will be omitted.

Figure 7:
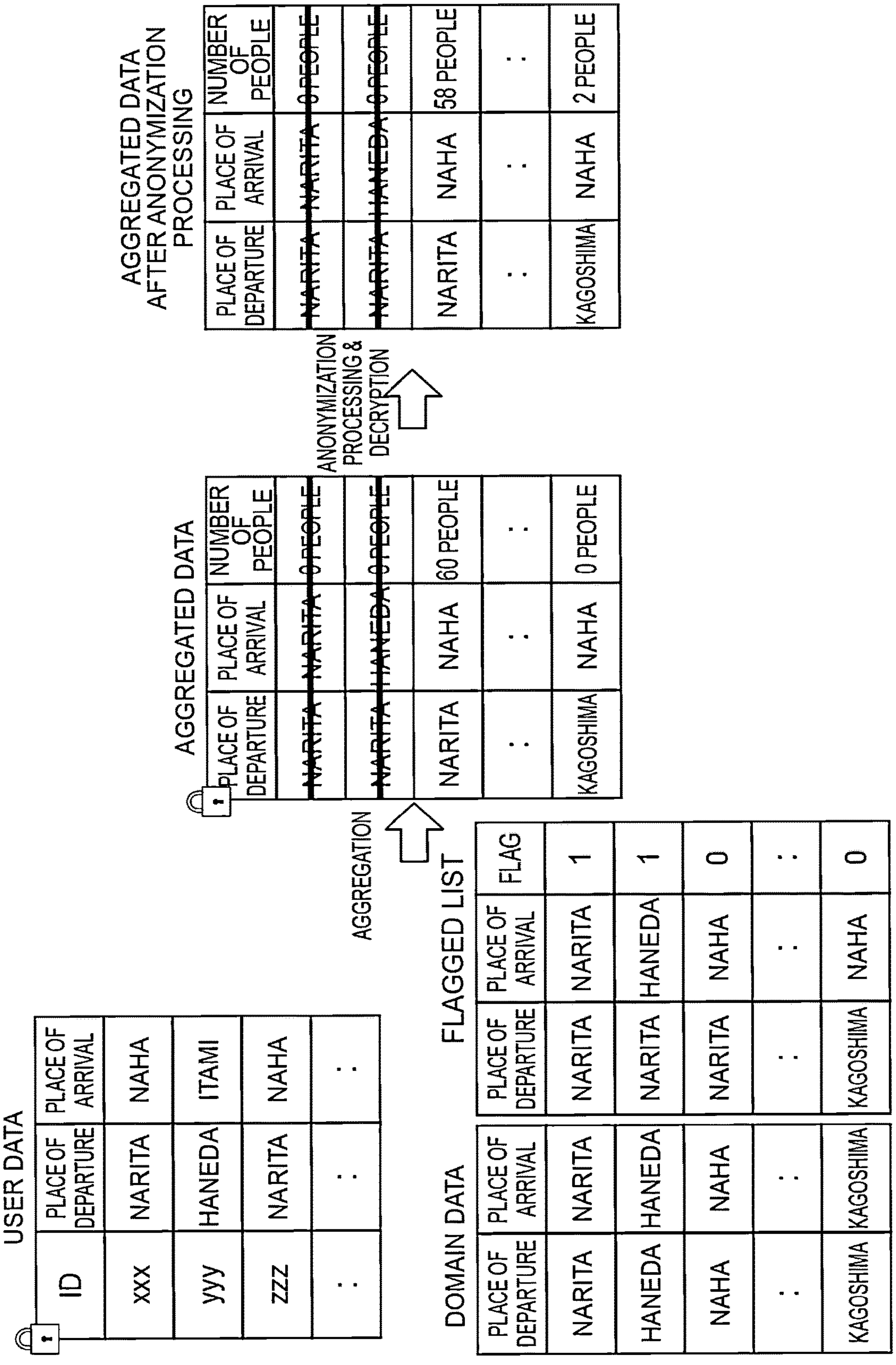
FIG. 7 is a diagram for explaining the process in the third embodiment.

First, user data stored in the user data storage unit 11 and domain data stored in the domain data storage unit 12 are acquired so that these can be executed in subsequent processing (step S1). Then, as in the second embodiment, the domain data storage unit 12 generates the above-described "flagged list" by assigning a structured zero flag to non-existent combinations (combinations that can be structured zeros) among all combinations of the possible values of a plurality of pieces of attribute information in the domain data at that time. For example, as shown in "flagged list" in FIG. 7, a structured zero flag "1" is assigned to a combination of place of departure "Narita" and place of arrival "Narita", which does not exist, and similarly, a structured zero flag "1" is assigned to a combination of place of departure "Narita" and place of arrival "Haneda", which does not exist. For existent combinations (for example, a combination of place of departure "Narita" and place of arrival "Naha"), the flag is set to "0". Such a flagged list is transmitted from the domain data storage unit 12 to the anonymization processing unit 15 through the aggregation processing unit 14.

Then, as in the first embodiment, the attribute information encryption unit 13 encrypts the attribute information of the user data using a homomorphic encryption method that enables aggregation processing (for example, an encryption method having additive homomorphism or complete homomorphism) (step S2), and the aggregation processing unit 14 aggregates the user data with the encrypted attribute information for combinations (combinations with a flag "0" in the example of FIG. 5) excluding combinations with the above flag assigned from all combinations of requirements by referring to the flagged list, thereby generating aggregated data with the encrypted attribute information (step S3A). In this manner, as shown in "aggregated data" in FIG. 7, aggregated data including the aggregation result (the number of people) with encrypted attribute information (place of departure, place of arrival) is generated. In this case, as shown by the strikethrough in FIG. 7, combinations that do not exist (combinations that can be structured zeros) are excluded from aggregation processing targets so as not to be included in the aggregated data. Therefore, it is possible to prevent a situation in which the aggregation results of flagged non-existent combinations (combinations that can be structured zeros) become non-zero values by anonymization processing and the usefulness of the aggregation results (statistical information) is lowered. On the other hand, among all combinations of requirements, structured zero combinations are excluded from aggregation processing targets, but combinations other than the structured zero combinations are aggregation targets even if the combinations other than the structured zero combinations do not exist in the user data. Therefore, as in the first embodiment, it is possible to avoid a situation in which unstructured zeros (combinations that exist structurally but are not output) occur.

Thereafter, the anonymization processing unit 15 performs anonymization processing on the above-described aggregated data (aggregated data with non-existent combinations removed) (step S4), and the decryption unit 16 decrypts the aggregated data after the anonymization processing to obtain aggregated data including the aggregation result after anonymization processing and the decrypted attribute information, and outputs the aggregated data in plain text (step S5). In this manner, as shown in "aggregated data after anonymization processing" in FIG. 7, aggregated data after non-existent combinations are removed, in which the attribute information (place of departure, place of arrival) has been decrypted and the aggregation result (the number of people) has been subjected to anonymization processing, is obtained and output.

According to the third embodiment described above, the aggregation results (the number of people) of non-existent combinations that can be structured zeros (for example, a combination of place of departure "Narita" and place of arrival "Narita" and a combination of place of departure "Narita" and place of arrival "Haneda") are not output. Therefore, it is possible to prevent a situation in which the aggregation results of non-existent combinations become non-zero values by anonymization processing and the usefulness of the aggregation results (statistical information) is lowered. In addition, as in the first embodiment, since all combinations that exist structurally are aggregation targets without omission even if these do not exist in the user data, it is possible to avoid a situation in which unstructured zeros (combinations that exist structurally but are not output) occur. As a result, it is possible to prevent unintended disclosure due to unstructured zeros.

Fourth Embodiment

In the fourth embodiment, in addition to the first embodiment in which unintended disclosure due to unstructured zeros is prevented, a form of preventing a situation, in which the aggregation results of structured zero combinations become non-zero values by subsequent anonymization processing and the usefulness of the aggregation results (statistical information) is lowered, by narrowing down the aggregation targets based on the aggregation target list excluding the structured zero combinations and then performing aggregation processing will be further described.

Since the functional block configuration of the privacy-protected data aggregation device 10 according to the fourth embodiment is the same as the above configuration shown in FIG. 1, repeated descriptions thereof will be omitted. However, among the functional units in FIG. 1, the aggregation processing unit 14 has a feature of aggregating the above user data for combinations included in the aggregation target list by referring to the aggregation target list in which combinations excluding non-existent combinations from all combinations of the possible values of a plurality of pieces of attribute information in the domain data are listed.

For example, the above-described "aggregation target list" may be generated in advance as described below and stored in the domain data storage unit 12, or may be generated from the domain data at that time by the domain data storage unit 12.

Figure 8:
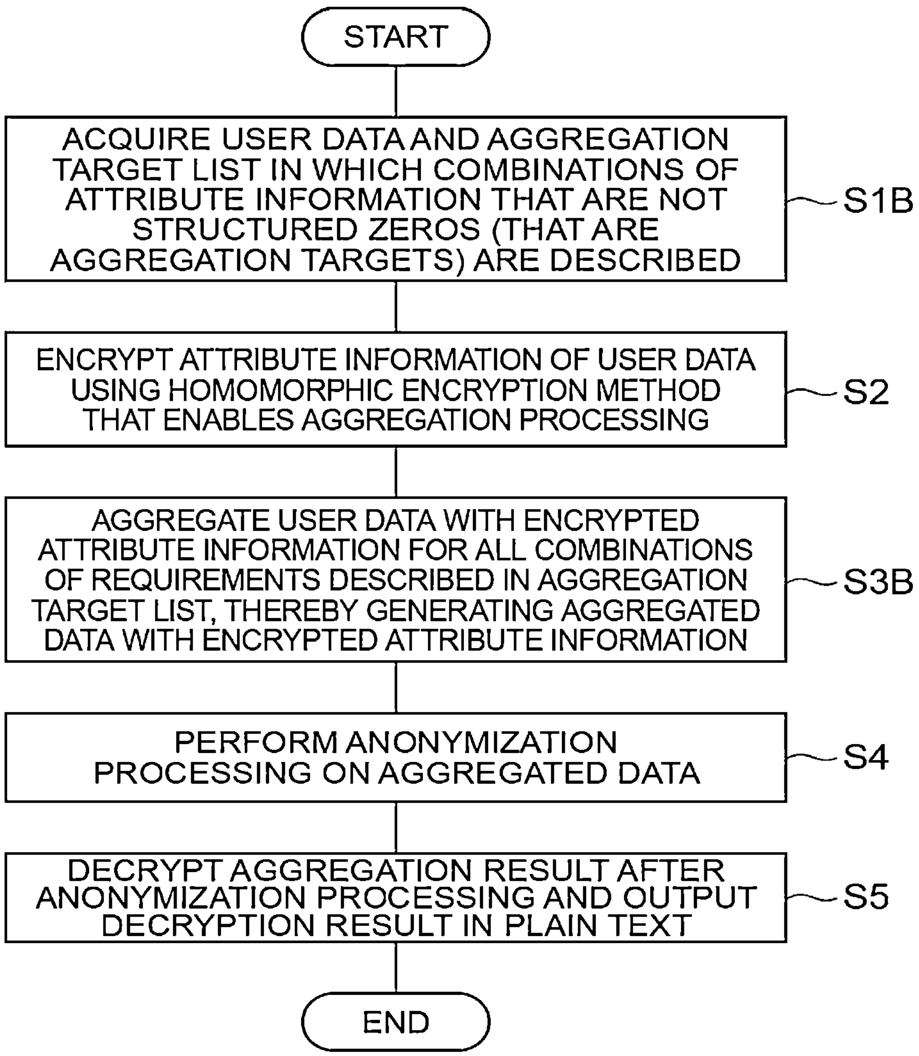
FIG. 8 is a flowchart showing a process in a fourth embodiment.

In the privacy-protected data aggregation device 10 according to the fourth embodiment, a process shown in FIG. 8 is performed. In addition, in FIG. 8, the same step numbers are given to the same processes as those in the first embodiment (FIG. 2), and detailed descriptions thereof will be omitted.

First, user data stored in the user data storage unit 11 and the above-described aggregation target list stored in the domain data storage unit 12 (a list in which combinations of attribute information that are not structured zeros (that are aggregation targets) are described) are acquired (step S1B). As illustrated as "aggregation target list" in FIG. 9, the aggregation target list is a list that includes all possible "combinations of departure and place of arrivals", and all the combinations in the list are aggregation targets.

Then, as in the first embodiment, the attribute information encryption unit 13 encrypts the attribute information of the user data using a homomorphic encryption method that enables aggregation processing (for example, an encryption method having additive homomorphism or complete homomorphism) (step S2). Then, the aggregation processing unit 14 aggregates the user data with the encrypted attribute information for all combinations described in the aggregation target list, thereby generating aggregated data with the encrypted attribute information (step S3B). In this manner, as shown in "aggregated data" in FIG. 9, aggregated data including the aggregation result (the number of people) with encrypted attribute information (place of departure, place of arrival) is generated for all combinations described in the aggregation target list. At this time, since combinations that do not exist (combinations that can be structured zeros) are excluded from the aggregation target list, the combinations that do not exist (combinations that can be structured zeros) are not aggregation processing targets and accordingly not included in the aggregated data. Therefore, it is possible to prevent a situation in which the aggregation results of non-existent combinations (combinations that can be structured zeros) become non-zero values by anonymization processing and the usefulness of the aggregation results (statistical information) is lowered. On the other hand, among all combinations of requirements, structured zero combinations are excluded from aggregation processing targets, but combinations other than the structured zero combinations are aggregation targets even if the combinations other than the structured zero combinations do not exist in the user data. Therefore, as in the first embodiment, it is possible to avoid a situation in which unstructured zeros (combinations that exist structurally but are not output) occur.

Thereafter, the anonymization processing unit 15 performs anonymization processing on the above-described aggregated data (aggregated data with non-existent combinations removed) (step S4), and the decryption unit 16 decrypts the aggregated data after the anonymization processing to obtain aggregated data including the aggregation results after the anonymization processing and the decrypted attribute information, and outputs the same in plain text (step S5). In this manner, as shown in "aggregated data after anonymization processing" in FIG. 9, aggregated data that non-existent combinations are removed, in which the attribute information (place of departure, place of arrival) has been decrypted and the aggregation result (the number of people) has been subjected to anonymization processing, is obtained and output.

According to the fourth embodiment described above, the aggregation results (the number of people) of non-existent combinations that can be structured zeros (for example, a combination of place of departure "Narita" and place of arrival "Narita" and a combination of place of departure "Narita" and place of arrival "Haneda") are not output. Therefore, it is possible to prevent a situation in which the aggregation results of non-existent combinations become non-zero values by anonymization processing and the usefulness of the aggregation results (statistical information) is lowered. In addition, as in the first embodiment, since all combinations that exist structurally are aggregation targets without omission even if these do not exist in the user data, it is possible to avoid a situation in which unstructured zeros (combinations that exist structurally but are not output) occur. As a result, it is possible to prevent unintended disclosure due to unstructured zeros.

Fifth Embodiment

In the fifth embodiment, a form will be described in which unintended disclosure due to unstructured zeros is prevented by cooperation between first and second device included in a privacy-protected data aggregation system.

Figure 10:
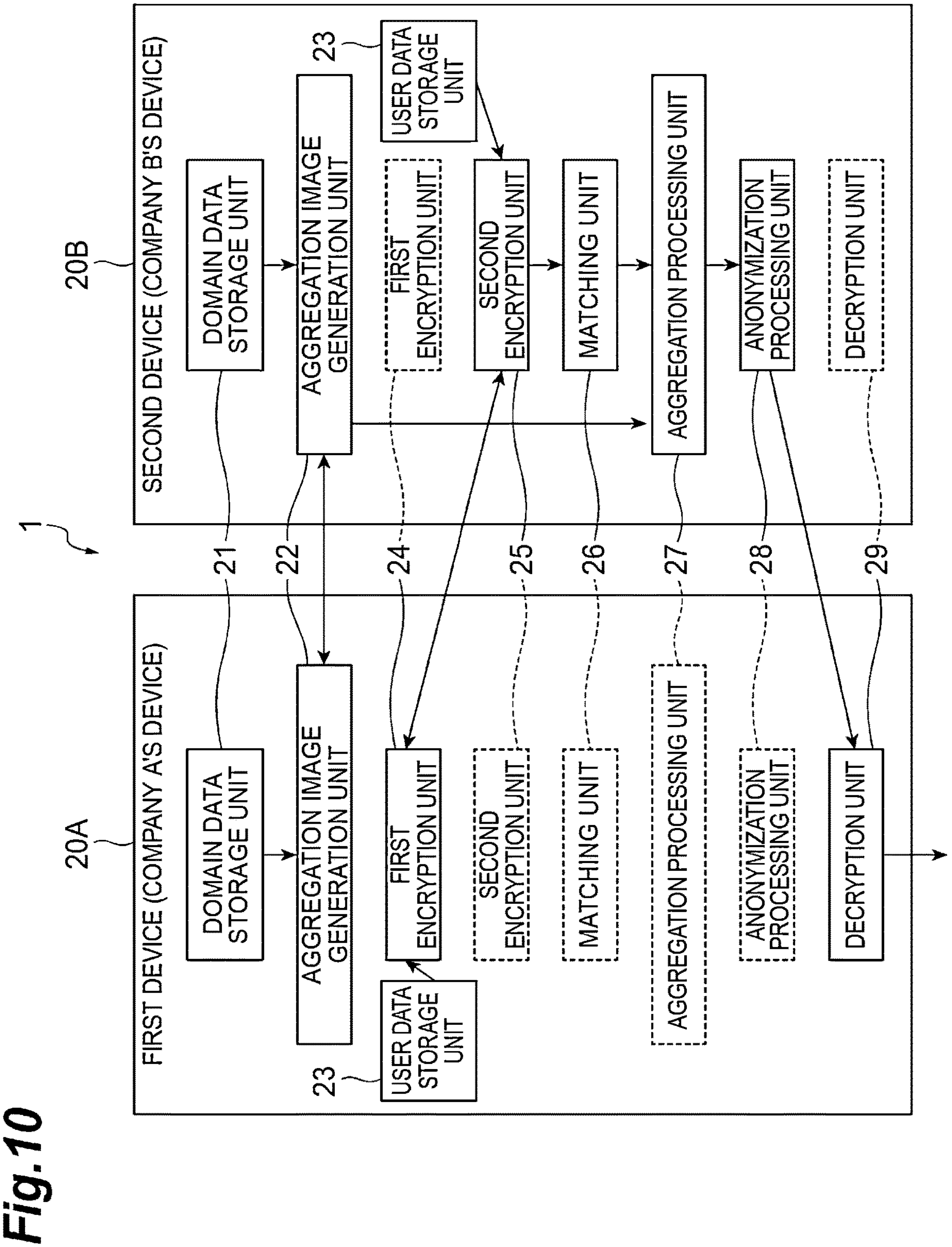
FIG. 10 is a functional block diagram of a privacy-protected data aggregation device according to each of fifth to eighth embodiments.

As shown in FIG. 10, a privacy-protected data aggregation system 1 according to the fifth embodiment includes a first device 20A that provides a first service and a second device 20B that provides a second service, and counts a number of target users through cooperation between the first device 20A and the second device 20B by processes described below.

In the present embodiment, the first device 20A and the second device 20B share the role of performing a series of processes. Although detailed descriptions will be given later, a form in which the second device 20B performs matching, aggregation processing, and anonymization processing and the first device 20A finally performs decryption and output will be described as an example. As functional blocks for this purpose, the first device 20A includes a domain data storage unit 21, an aggregation image generation unit 22, a user data storage unit 23, a first encryption unit 24, and a decryption unit 29, all of which are shown by solid lines in FIG. 10, and the second device 20B includes a domain data storage unit 21, an aggregation image generation unit 22, a user data storage unit 23, a second encryption unit 25, a matching unit 26, an aggregation processing unit 27, and an anonymization processing unit 28, all of which are shown by solid lines in FIG. 10.

However, the above-described division of roles, in which the second device 20B performs matching, aggregation processing, and anonymization processing and the first device 20A finally performs decryption and output, is an example. For example, the first device 20A and the second device 20B may have a common functional block configuration in both devices by including functional units shown by dashed lines in FIG. 10. In this case, it is possible to realize a division of roles in which the first device 20A performs matching, aggregation processing, and anonymization processing and the second device 20B finally performs decryption and output.

Hereinafter, an overview of each functional unit will be given. The user data storage unit 23 of the first device 20A is a functional unit that stores first user data including a first user ID and first attribute information regarding a user of the first service, and the domain data storage unit 21 is a functional unit that stores domain data that defines possible values of the first attribute information. Similarly, the user data storage unit 23 of the second device 20B is a functional unit that stores second user data including a second user ID and second attribute information regarding a user of the second service, and the domain data storage unit 21 is a functional unit that stores domain data that defines possible values of the second attribute information.

The aggregation image generation unit 22 included in both the first device 20A and the second device 20B generates an aggregation image, in which all combinations of the first attribute information and the second attribute information are described, based on first domain data that defines the possible values of the first attribute information and second domain data that defines the possible values of the second attribute information, and shares the generated aggregation image with the second device 20B.

The first encryption unit 24 is a functional unit that encrypts the first user ID with a private key for user ID of the first device and encrypts the first attribute information with a private key for attribute information of the first device and transmits first user data including the encrypted first user ID and first attribute information to the second device 20B and that receives an encrypted second user ID, which is obtained by encrypting the second user ID with a private key for user ID of the second device 20B, from the second device 20B, encrypts the encrypted second user ID with the private key for user ID of the first device 20A, and transmits the encryption result to the second device 20B.

The second encryption unit 25 is a functional unit that further encrypts the first user ID, which is encrypted with the private key for user ID of the first device by the first encryption unit 24, with a private key for user ID of the second device 20B and that encrypts the second user ID with the private key for user ID of the second device 20B, transmits the encrypted second user ID to the first device 20A, and acquires the second user ID that has been further encrypted with the private key for user ID of the first device 20A by the first device 20A.

The matching unit 26 is a functional unit that matches the first user data encrypted by the first encryption unit 24 with the second user data by comparing the first user ID and the second user ID, both of which are encrypted with the private key for user ID of the first device 20A and the private key for user ID of the second device 20B.

The aggregation processing unit 27 is a functional unit that categorizes the matched data based on the unencrypted second attribute information in the second user data and aggregates the categorized matched data for all combinations described in the above aggregation image to obtain aggregated data including aggregation results for each combination of the encrypted first attribute information and the unencrypted second attribute information.

The anonymization processing unit 28 is a functional unit that performs anonymization processing on the aggregated data by adding noise generated based on the published computation key of the first device 20A to the aggregated data obtained by the aggregation processing unit 27. Here, the aggregated data after noise is added satisfies differential privacy. In addition, as types of noise, for example, a Laplace mechanism, a Gaussian mechanism, and an exponential mechanism can be adopted. The same applies to "noise" described in the following embodiments.

The decryption unit 29 is a functional unit that decrypts the aggregated data subjected to anonymization processing based on the published computation key of the first device 20A and the private key for attribute information of the first device 20A to obtain aggregated data including the decrypted anonymized aggregation results for each combination of the decrypted first attribute information and the unencrypted second attribute information.

Figure 11:
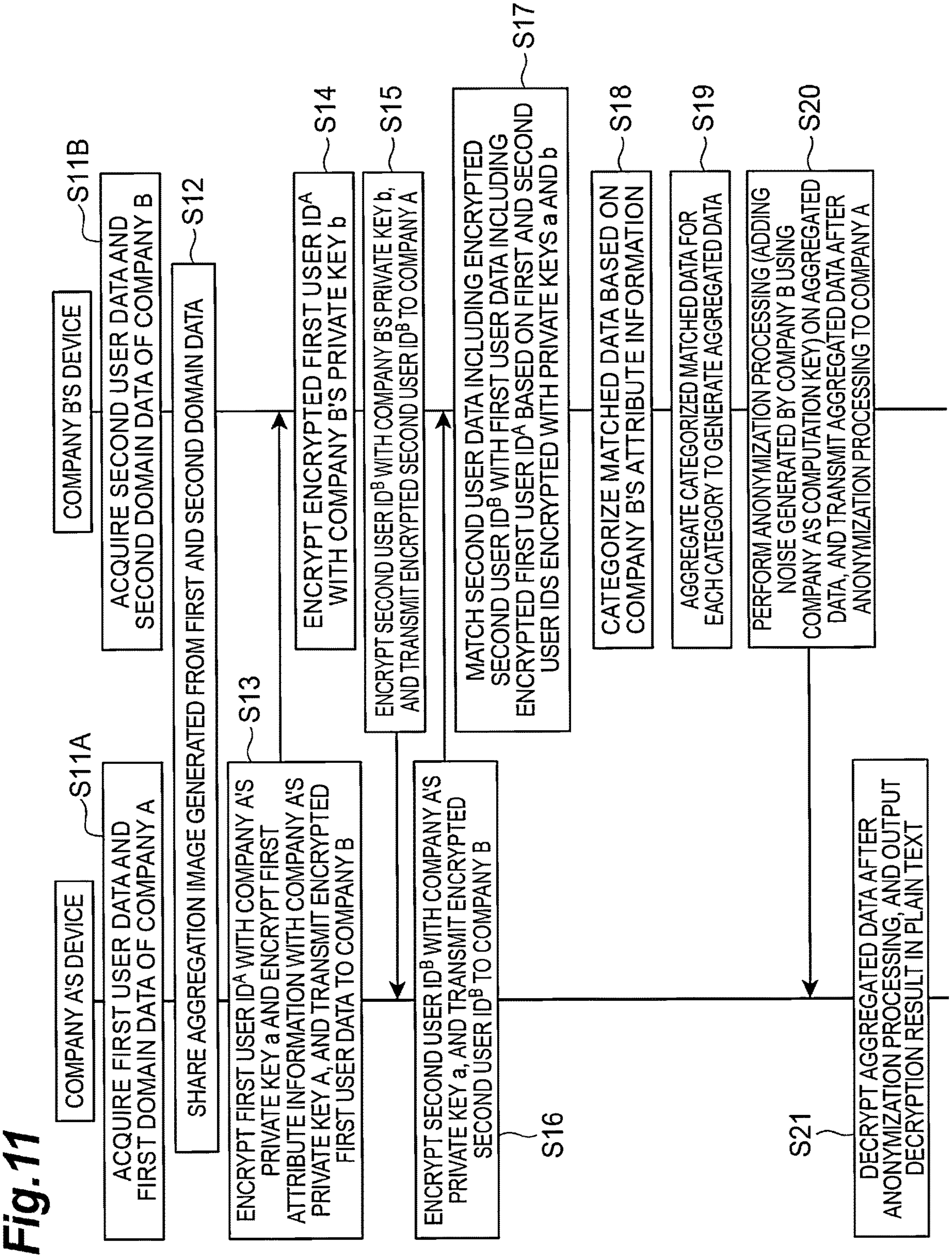
FIG. 11 is a flowchart showing a process in the fifth embodiment.

In the privacy-protected data aggregation system 1 configured as described above, a process shown in FIG. 11 is performed.

First, in the first device (also called company A's device) 20A, the first user data stored in the user data storage unit 23 and the domain data stored in the domain data storage unit 21 are read and acquired so that these can be executed in subsequent processing (step S11A). As illustrated in FIG. 12(*a*), the first user data includes a user ID ($ID^A$), a place of departure, and place of arrival, and the above-described domain data includes possible values (Haneda, Naha, Fukuoka, . . . ) for the "place of departure" and possible values (Haneda, Naha, Fukuoka, . . . ) for the "place of arrival". The name of the airport is used for the "place of departure" and the "place of arrival" in the first user data and domain data related to the first device (company A's device). On the other hand, in the second device (also called company B's device) 20B as well, the second user data stored in the user data storage unit 23 and the domain data stored in the domain data storage unit 21 are acquired so that these can be executed in subsequent processing (step S11B). As illustrated in FIG. 12(*b*), the second user data includes a user ID ($ID^B$), a place of departure, place of arrival, and means of transportation, and the above-described domain data includes possible values (Haneda, Naha, Fukuoka, . . . ) for the "place of departure", possible values (Haneda, Naha, Fukuoka, . . . ) for the "place of arrival" (Haneda, Naha, Fukuoka, . . . ), and possible values (airplane, Shinkansen, car, . . . ) for the "means of transportation". The names of prefectures are used for the "place of departure" and the "place of arrival" in the second user data and domain data related to the second device (company B's device).

Then, the aggregation image generation units 22 of the first and second devices cooperate with each other to generate an aggregation image such as that shown in FIG. 13, in which all combinations of the first attribute information and the second attribute information are described, based on the first domain data that defines the possible values of the first attribute information and the second domain data that defines the possible values of the second attribute information, and share the generated aggregation image with each other. As shown in FIG. 13, the aggregation image includes all combinations of the first attribute information (company A's "place of departure" and "place of arrival") and the second attribute information (company B's "place of departure", "place of arrival", and "means of transportation"), and an "aggregation result" column is provided for each combination.

Figure 14:
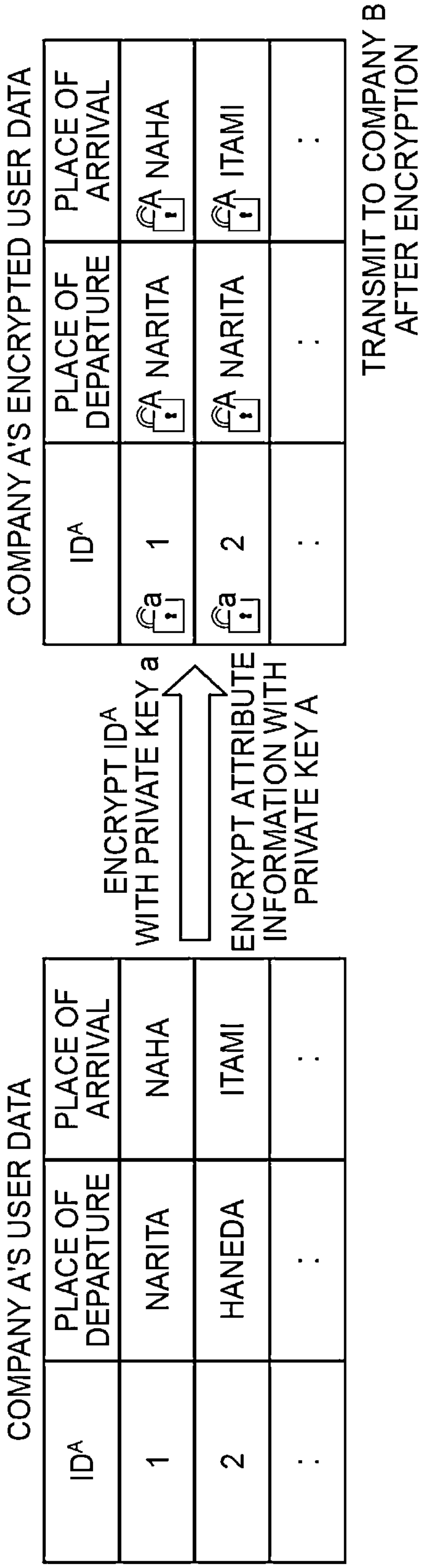
FIG. 14 is a diagram showing the encryption of the company A's user data by the company A.

Then, as shown in FIG. 14, the first encryption unit 24 of the first device (company A's device) 20A encrypts the first user $ID^A$ in the first user data with the company A's private key a and encrypts the first attribute information (place of departure, place of arrival) with company A's private key A, and transmits the encrypted first user data to the second encryption unit 25 of the second device (company B's device) 20B (step S13).

Figure 15:
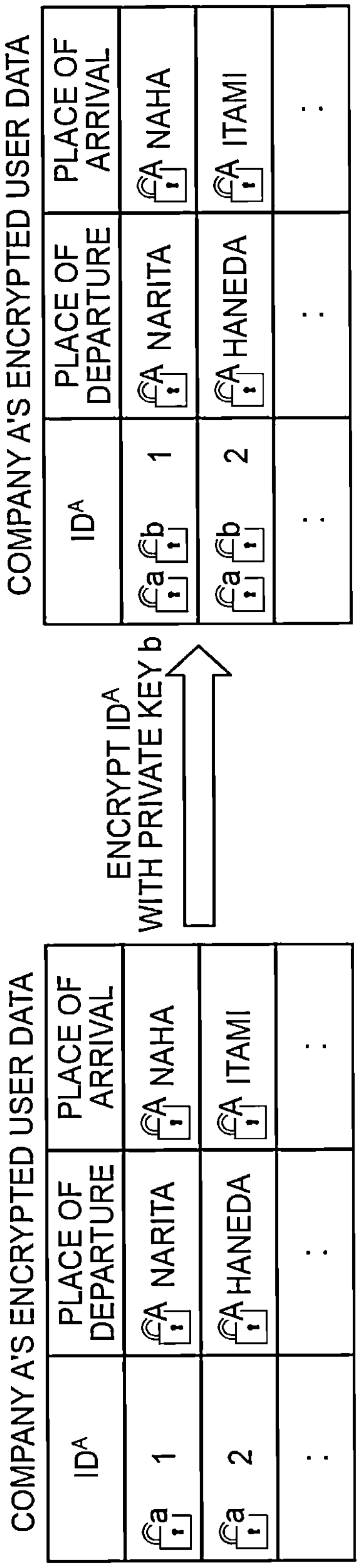
FIG. 15 is a diagram showing the encryption of a user ID in the company A's user data by the company B.
Figure 16:
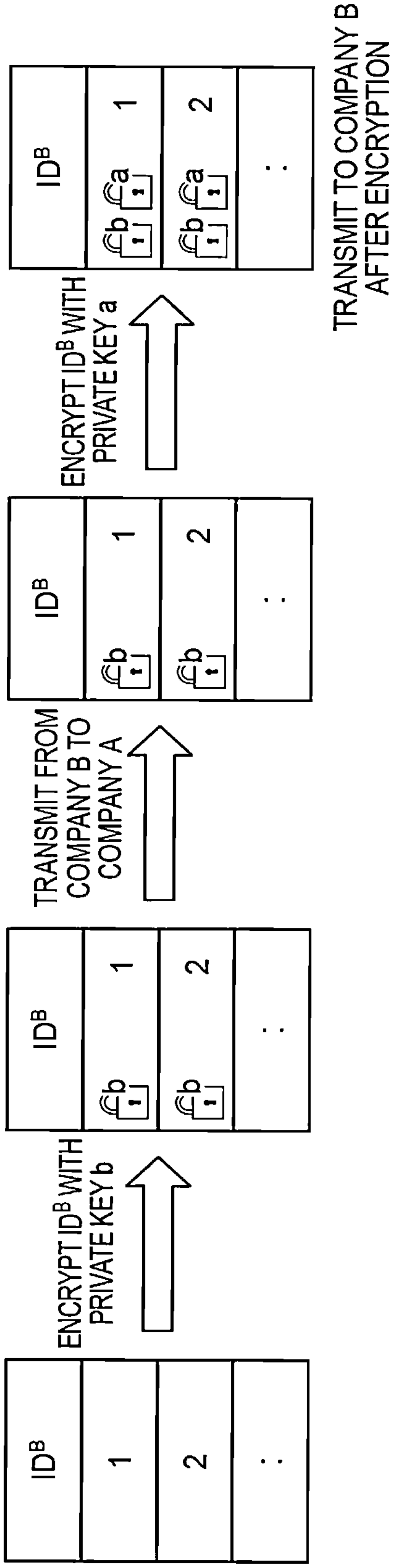
FIG. 16 is a diagram showing the encryption of a user ID in the company B's user data by the company B and the company A.

Then, as shown in FIG. 15, the second encryption unit 25 of the second device (company B's device) 20B further encrypts the first user IDA in the transmitted encrypted first user data with the company B's private key b (step S14), and as shown in FIG. 16, the second encryption unit 25 of the second device (company B's device) 20B encrypts the second user $ID^B$ in the second user data with company B's private key b and transmits the encrypted second user $ID^B$ to the first encryption unit 24 of the first device (company A's device) 20A (step S15).

Then, as shown in FIG. 16, the first encryption unit 24 of the first device (company A's device) 20A further encrypts the transmitted encrypted second user $ID^B$ with the company A's private key a, and transmits the encrypted second user $ID^B$ to the second encryption unit 25 of the second device (company B's device) 20B (step S16). The encrypted second user $ID^B$ received by the second encryption unit 25 of the second device (company B's device) 20B is transmitted to the matching unit 26.

Figure 17:
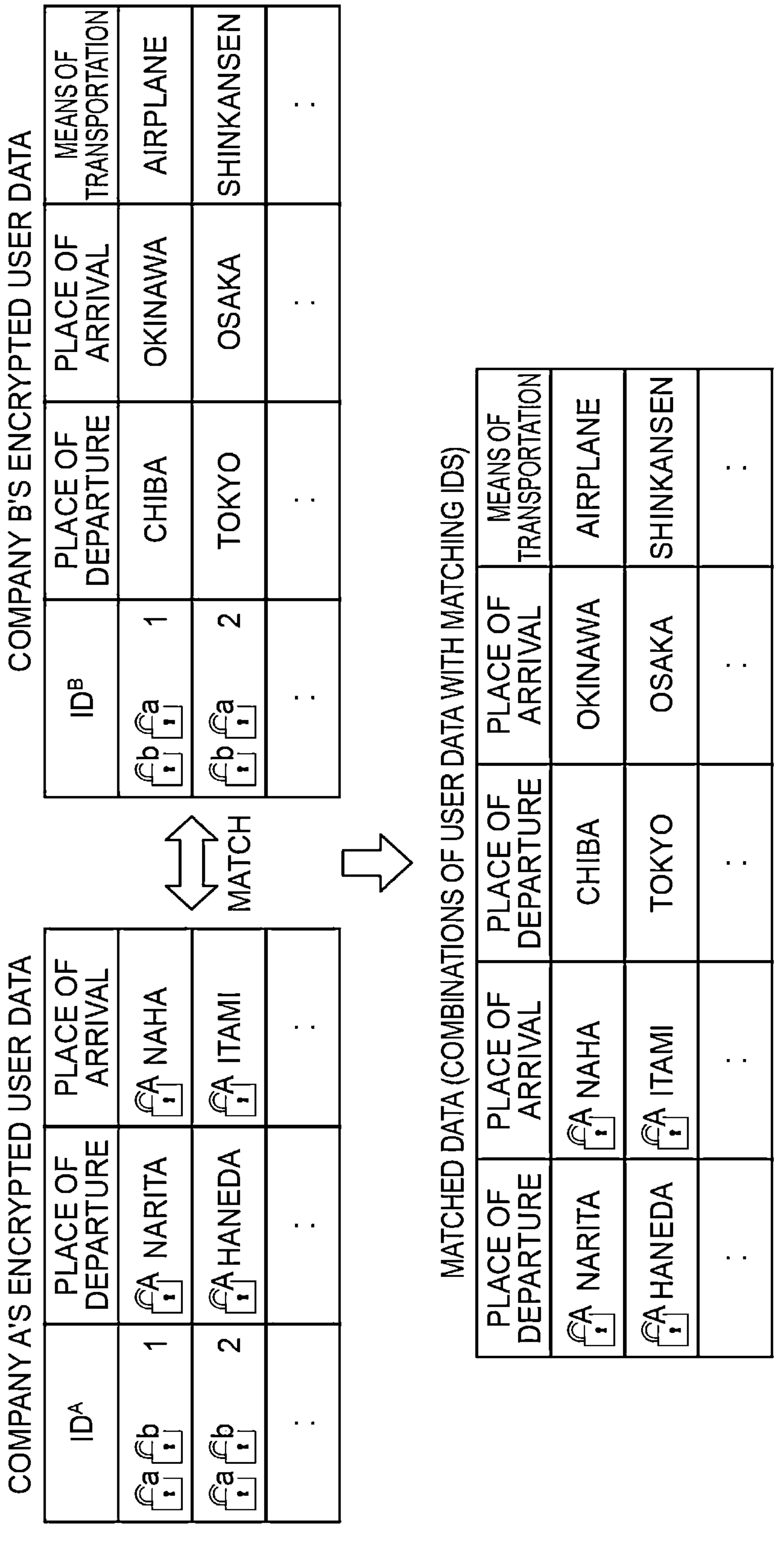
FIG. 17 is a diagram showing matching processing by the company B.

Then, as shown in FIG. 17, the matching unit 26 of the second device (company B's device) 20B matches the second user data including the encrypted second user $ID^B$ with the first user data including the encrypted first user $ID^A$ based on the first and second user IDs encrypted with the private keys a and b (step S17) to obtain matched data. The matched data obtained herein includes a combination of first and second user data with matching IDs, and includes first attribute information (place of departure, place of arrival) encrypted with company A's private key A and unencrypted second attribute information (place of departure, place of arrival, means of transportation) as illustrated in FIG. 17. The matched data is transmitted to the aggregation processing unit 27.

Then, as shown in FIG. 18, the aggregation processing unit 27 of the second device (company B's device) 20B categorizes the matched data according to whether or not the unencrypted second attribute information (company B's attribute information) is common (step S18). Then, as shown in FIG. 19, the aggregation processing unit 27 of the second device (company B's device) 20B aggregates the categorized matched data for each category to generate aggregated data (step S19). Here, as shown in FIG. 18, the "place of departure, place of arrival, means of transportation" in the second attribute information is categorized into data of "Chiba, Okinawa, airplane" and data of "Tokyo, Osaka, Shinkansen". Of these, for the data of "Chiba, Okinawa, airplane", the first attribute information (Narita, Naha) is encrypted with the company A's private key A. Therefore, since it can be determined that the same bit string is set and the first attribute information is the same although the contents are not known, the aggregation result is "2". On the other hand, for the data of "Tokyo, Osaka, Shinkansen", the first attribute information is also encrypted with the company A's private key A. Therefore, although the contents are not known, depending on whether the bit string is the same or not, data with first attribute information of "Haneda, Itami" and data with first attribute information of "Haneda, Kansai International" are aggregated separately. For the data with the first attribute information of "Haneda, Itami", the aggregation result is "2", and for the data with the first attribute information of "Haneda, Kansai International", the aggregation result is "1". In addition, in the present embodiment, the aggregation result is encrypted with the company A's computation key, which is a kind of public key.

The processing of steps S18 and S19 described above is performed on all combinations of the first attribute information and the second attribute information included in the aggregation image of FIG. 13. Therefore, since all combinations that exist structurally are aggregation targets without omission even if these do not exist in the user data, it is possible to avoid a situation in which unstructured zeros (combinations that exist structurally but are not output) occur.

Then, the anonymization processing unit 28 of the second device (company B's device) 20B performs anonymization processing (as an example, adding noise generated by the company B using the company A's computation key as shown in FIG. 20) on the aggregated data, and transmits the aggregated data after anonymization processing to the decryption unit 29 of the first device (company A's device) 20A (step S20).

Then, the decryption unit 29 of the first device (company A's device) 20A decrypts the transmitted aggregated data after anonymization processing, and outputs the decryption result as plain text's statistical information shown on the right side of FIG. 21 (step S21). At this time, the first attribute information included in the aggregated data after anonymization processing is encrypted with the company A's private key A. However, the decryption unit 29 can decrypt the first attribute information because the decryption unit 29 can use its own private key A. In addition, the aggregation result included in the aggregated data after anonymization processing is encrypted with the company A's computation key. However, the decryption unit 29 can also decrypt the aggregation result because the decryption unit 29 can use its own computation key.

According to the fifth embodiment described above, processing such as aggregation is performed on all combinations of the first attribute information and the second attribute information. Therefore, since all combinations that exist structurally are aggregation targets without omission even if these do not exist in the user data, it is possible to avoid a situation in which unstructured zeros (combinations that exist structurally but are not output) occur. As a result, it is possible to prevent unintended disclosure due to unstructured zeros.

Sixth Embodiment

In the sixth embodiment, in addition to the fifth embodiment in which unintended disclosure due to unstructured zeros is prevented, a form of preventing a situation, in which the aggregation results of structured zero combinations become non-zero values and the usefulness of the aggregation results (statistical information) is lowered, by excluding the structured zero combinations from anonymization processing targets and fixing the aggregation results to zero will be further described.

Since the functional block configuration of a privacy-protected data aggregation system 1 according to the sixth embodiment is the same as the above configuration shown in FIG. 10, repeated descriptions thereof will be omitted. However, among the functional units in FIG. 10, the aggregation image generation unit 22 has a feature of generating a flagged list by assigning a flag to non-existent combinations (that is, structured zero combinations), among the combinations described in the aggregation image, based on the generated aggregation image, and the anonymization processing unit 28 has a feature of fixing the aggregation results for flagged combinations in the aggregated data to zero and performing anonymization processing on combinations that are not flagged in the aggregated data by referring to the flagged list.

First, referring to FIG. 22, a pattern in which structured zero occurs in the user data of companies A and B will be described. As shown in FIG. 22, there are four patterns (1) to (4) in total that result in structured zeros.

Pattern (1) is a pattern in which the attribute information of the data of the company A (or the company B) is the same. For example, a pattern in which the "place of departure" and the "place of arrival" in the attribute information of the company A are both "Haneda airport" can be mentioned. In addition, in the table of FIG. 22, "*" indicates any value. Any pattern in which the "place of departure" and the "place of arrival" in the attribute information of the company A are both "Haneda airport" corresponds to pattern (1) regardless of the value of the company B's attribute information.

Pattern (2) is a pattern in which the attribute information of the data of the company A (or the company B) is different but the combination does not exist. For example, a pattern in which the "place of departure" and the "place of arrival" in the attribute information of the company A are "Haneda airport" and "Narita Point", respectively, but the combination does not exist can be mentioned.

Pattern (3) is a pattern in which the attribute information "place of departure" related to the "place of departure" in the company A's data and the attribute information related to the "place of arrival" in the company B's data are the same. For example, a pattern in which the "place of departure" in the attribute information of the company A and the "place of arrival" in the attribute information of the company B are both "Haneda airport" can be mentioned. That is, this is a pattern in which the attribute information of the company A and the attribute information of the company B may exist individually but combining these forms a combination that does not exist.

Pattern (4) is a pattern in which the attribute information "place of departure" related to the "place of departure" in the company A's data and the attribute information related to the "place of arrival" in the company B's data are different but the combination does not exist. For example, a pattern in which the "place of departure" in the attribute information of the company A is "Haneda airport" and the "place of arrival" in the attribute information of the company B is "Tokyo" but the combination does not exist can be mentioned. Similarly to the above pattern (3), this is also a pattern in which the attribute information of the company A and the attribute information of the company B may exist individually but combining these forms a combination that does not exist.

Figure 23:
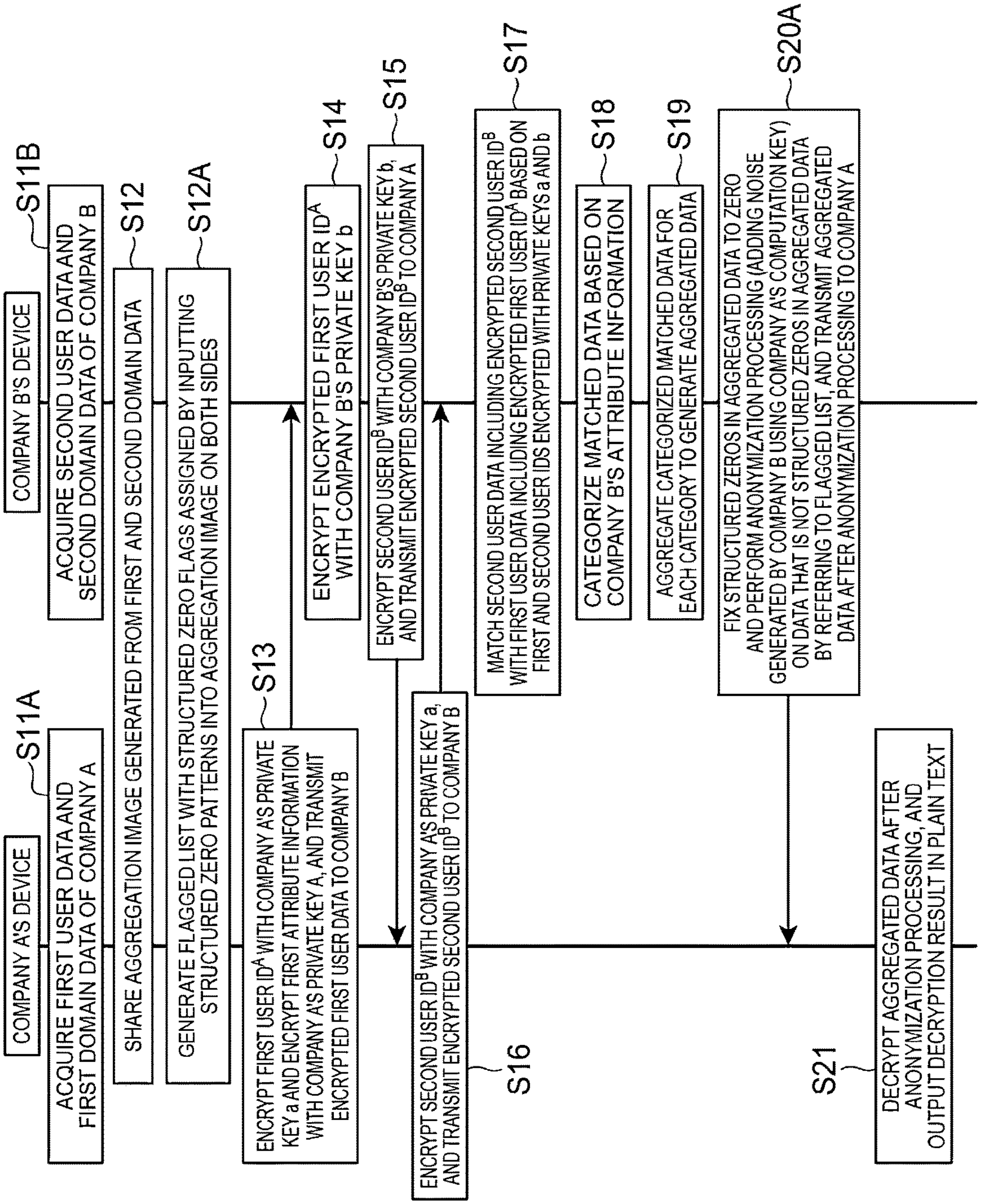
FIG. 23 is a flowchart showing a process in a sixth embodiment.

In the privacy-protected data aggregation system 1 according to the sixth embodiment, a process shown in FIG. 23 is performed. In addition, in FIG. 23, the same step numbers are given to the same processes as those in the fifth embodiment (FIG. 11), and detailed descriptions thereof will be omitted.

First, first user data and domain data of the company A's device 20A and second user data and domain data of the company B's device 20B are acquired so that these can be executed in subsequent processing (steps S11A and S11B). The aggregation image generation units 22 of the first and second devices cooperate with each other to generate an aggregation image such as that shown in FIG. 13, in which all combinations of the first attribute information and the second attribute information are described, and share the generated aggregation image with each other (step S12). In addition, by inputting structured zero patterns into the aggregation image on both sides, a flagged list with structured zero flags assigned as shown in FIG. 24 is generated (step S12A). FIG. 24 illustrates an example of a flagged list in which a column for "structured zero flag" is added to the aggregation image. In addition, although only data with a structured zero flag set to "1" is shown in FIG. 24, it is needless to say that the flag is set to "0" for combinations of attribute information that are not structured zeros.

Thereafter, steps S13 to S18 in FIG. 23 are executed in the same manner as in the fifth embodiment. In addition, the aggregation processing unit 27 of the company B's device 20B aggregates the user data (matched data) categorized based on the attribute information of the company B for each category (step S19). Here, for example, using a flagged list as shown in FIG. 25, an aggregation result for each combination in the flagged list is obtained, and aggregated data is obtained by encrypting the aggregation result with the published computation key of the company A.

Then, as shown in FIG. 26, the anonymization processing unit 28 of the company B's device 20B fixes the aggregation results for combinations with a flag "1" in the aggregated data to zero and performs anonymization processing (adding noise generated by the company B using the company A's computation key) on unflagged combinations in the aggregated data by referring to the flagged list, and transmits the aggregated data after anonymization processing to the decryption unit 29 of the first device (company A's device) 20A (step S20A). In addition, the decryption unit 29 of the first device (company A's device) 20A decrypts the transmitted aggregated data after anonymization processing, and outputs the decryption result as plain text's statistical information shown on the right side of FIG. 27 (step S21).

According to the sixth embodiment described above, the aggregation results for combinations with a flag "1" (combinations that can be structured zeros) in the flagged list are fixed to zero without anonymization processing and output. Therefore, it is possible to prevent a situation in which the aggregation results of non-existent combinations become non-zero values by anonymization processing and the usefulness of the aggregation results (statistical information) is lowered. In addition, as in the fifth embodiment, since all combinations that exist structurally are aggregation targets without omission even if these do not exist in the user data, it is possible to avoid a situation in which unstructured zeros (combinations that exist structurally but are not output) occur. As a result, it is possible to prevent unintended disclosure due to unstructured zeros.

In addition, in the sixth embodiment, an example is shown in which the aggregation results for combinations with a flag "1" (combinations that can be structured zeros) in the flagged list are fixed to zero and output. However, instead of this, a form may be adopted in which the aggregation results for combinations with a flag "1" are not output.

Seventh Embodiment

In the seventh embodiment, in addition to the fifth embodiment in which unintended disclosure due to unstructured zeros is prevented, a form of preventing a situation, in which the aggregation results of structured zero combinations become non-zero values and the usefulness of the aggregation results (statistical information) is lowered, by excluding the structured zero combinations from anonymization processing targets and fixing the aggregation results to zero will be further described.

Since the functional block configuration of the privacy-protected data aggregation system 1 according to the seventh embodiment is the same as the above configuration shown in FIG. 10, repeated descriptions thereof will be omitted. However, among the functional units in FIG. 10, the aggregation image generation unit 22 has a feature of generating a flagged list by assigning a flag to non-existent combinations (that is, structured zero combinations), among the combinations described in the aggregation image, based on the aggregation image in which all combinations of the first attribute information and the second attribute information are described, and the aggregation processing unit 27 has a feature of aggregating user data for combinations that are not flagged by referring to the flagged list.

Figure 28:
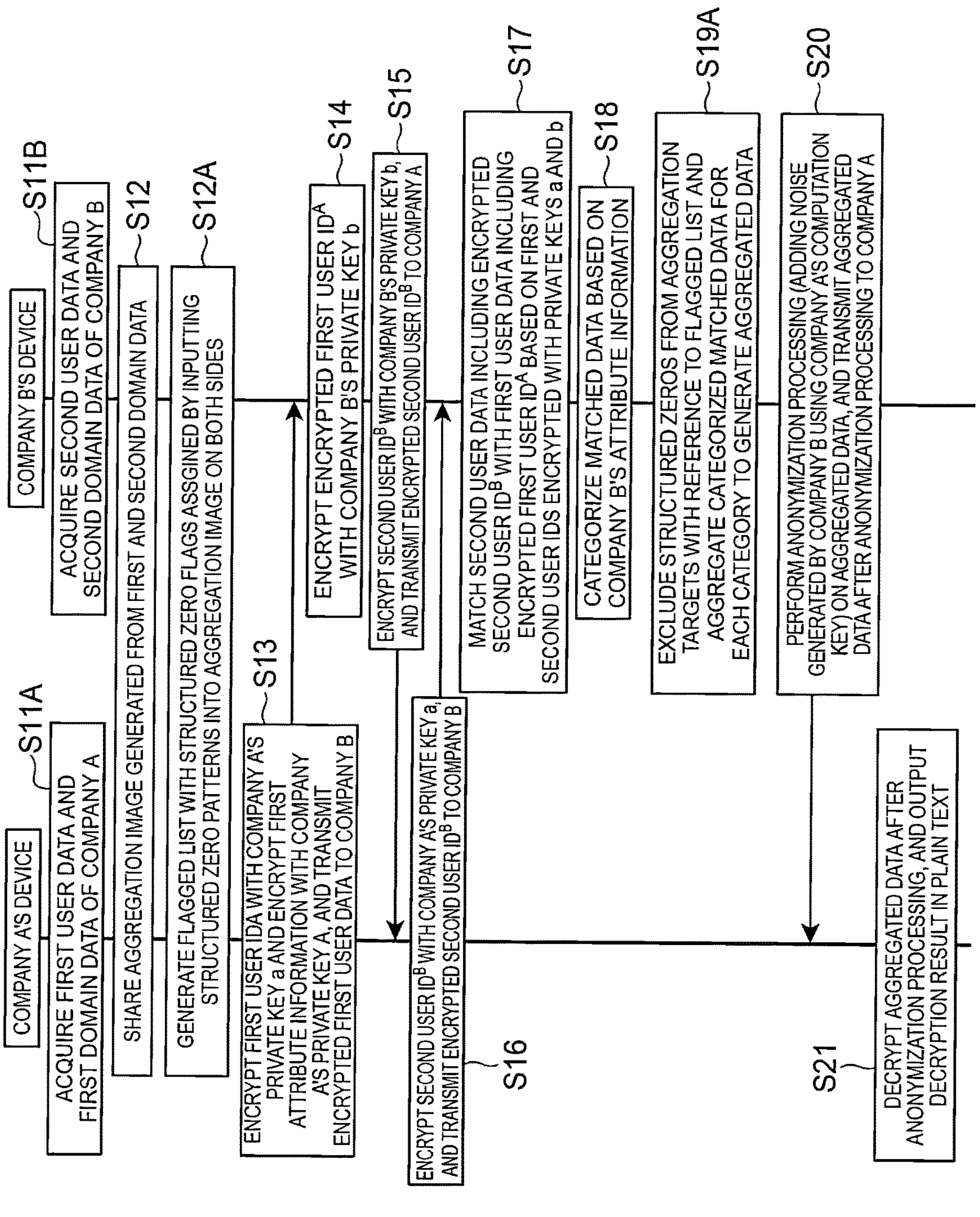
FIG. 28 is a flowchart showing a process in a seventh embodiment.

In the privacy-protected data aggregation system 1 according to the seventh embodiment, a process shown in FIG. 28 is performed. In addition, in FIG. 28, the same step numbers are given to the same processes as those in the fifth embodiment (FIG. 11), and detailed descriptions thereof will be omitted.

First, first user data and domain data of the company A's device 20A and second user data and domain data of the company B's device 20B are acquired so that these can be executed in subsequent processing (steps S11A, S11B). As in the sixth embodiment, an aggregation image such as that shown in FIG. 13, in which all combinations of the first attribute information and the second attribute information are described, is generated and shared (step S12). By inputting structured zero patterns into the aggregation image, a flagged list with structured zero flags assigned as shown in FIG. 24 is generated (step S12A).

Thereafter, steps S13 to S18 in FIG. 23 are executed in the same manner as in the fifth embodiment, and the aggregation processing unit 27 of the company B's device 20B aggregates the user data (matched data) categorized based on the company B's attribute information for each category. At this time, as shown in FIG. 29, flagged combinations are excluded, and user data is aggregated for unflagged combinations (step S19A). In FIG. 29, combinations that are excluded from aggregation targets are crossed out.

Thereafter, as shown in FIG. 30, the anonymization processing unit 28 of the company B's device 20B performs anonymization processing (here, adding noise generated by the company B using the company A's computation key) on the aggregated data (here, aggregated data from which structured zeros have already been removed), and transmits the aggregated data after anonymization processing to the decryption unit 29 of the first device (company A's device) 20A (step S20). In addition, the decryption unit 29 of the first device (company A's device) 20A decrypts the transmitted aggregated data after anonymization processing, and outputs the decryption result as plain text's statistical information shown on the right side of FIG. 31 (step S21).

According to the seventh embodiment described above, combinations with a flag "1" (combinations that can be structured zeros) in the flagged list are excluded from aggregation targets and are not included in the aggregation results. Therefore, it is possible to prevent a situation in which the aggregation results of non-existent combinations become non-zero values by anonymization processing and the usefulness of the aggregation results (statistical information) is lowered. In addition, as in the fifth embodiment, since all combinations that exist structurally are aggregation targets without omission even if these do not exist in the user data, it is possible to avoid the occurrence of unstructured zeros (combinations that exist structurally but are not output). As a result, it is possible to prevent unintended disclosure due to unstructured zeros.

In addition, in the seventh embodiment, an example is shown in which the aggregation results for combinations with a flag "1" (combinations that can be structured zeros) in the flagged list are not output. However, instead of this, a form may be adopted in which the aggregation results for combinations with a flag "1" are fixed to zero and output.

Eighth Embodiment

In the eighth embodiment, in addition to the fifth embodiment in which unintended disclosure due to unstructured zeros is prevented, a form of preventing a situation, in which the aggregation results of structured zero combinations become non-zero values by subsequent anonymization processing and the usefulness of the aggregation results (statistical information) is lowered, by narrowing down the aggregation targets based on the aggregation target list excluding non-existent combinations and then performing aggregation processing will be further described.

Since the functional block configuration of the privacy-protected data aggregation system 1 according to the eighth embodiment is the same as the above configuration shown in FIG. 10, repeated descriptions thereof will be omitted. However, among the functional units in FIG. 10, the aggregation image generation unit 22 has a feature of generating an aggregation target list in which combinations excluding non-existent combinations from the combinations described in the generated aggregation image are listed, and the aggregation processing unit 27 has a feature of aggregating user data for combinations included in the aggregation target list by referring to the aggregation target list.

Figure 32:
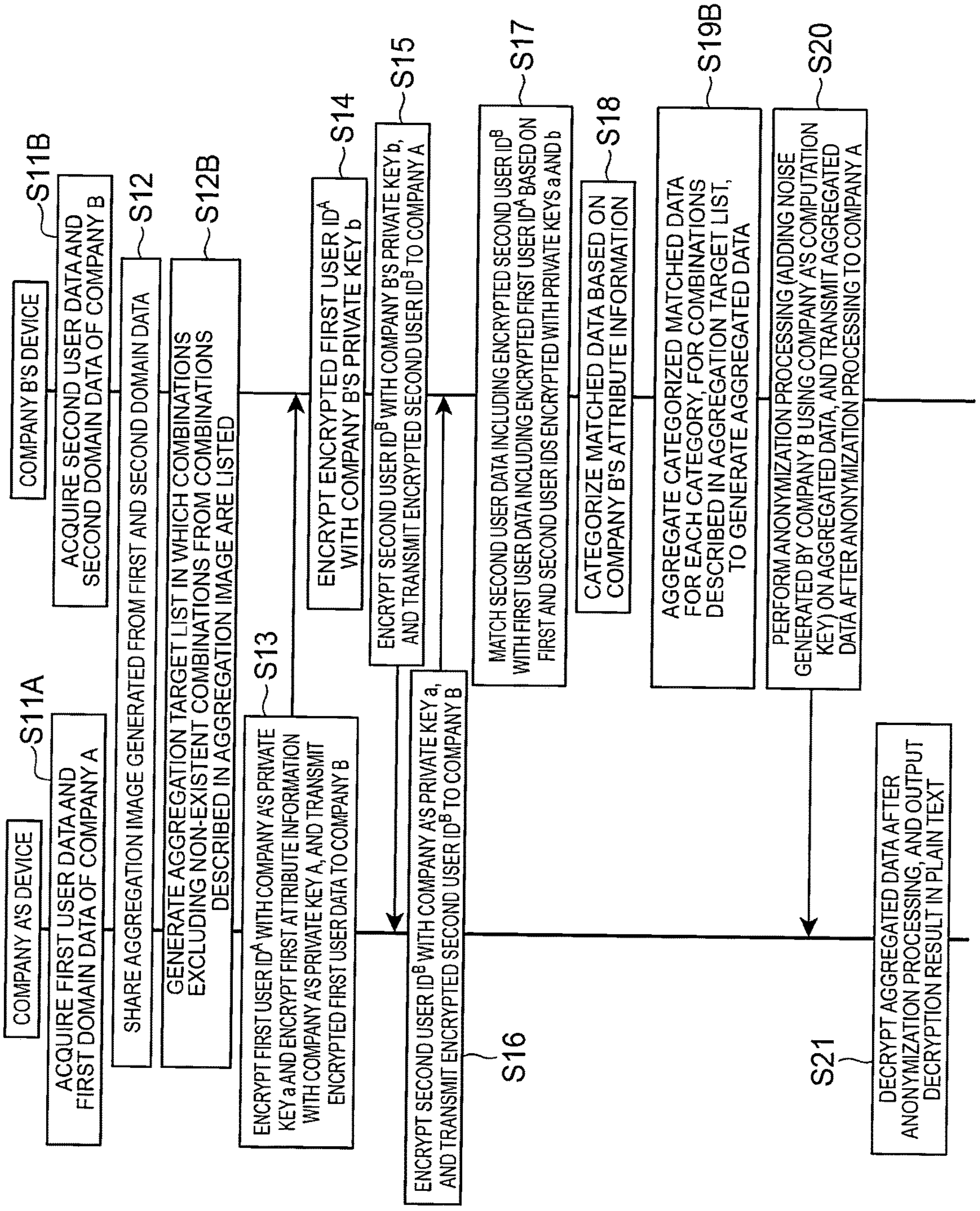
FIG. 32 is a flowchart showing a process in an eighth embodiment.

In the privacy-protected data aggregation system 1 according to the eighth embodiment, a process shown in FIG. 32 is performed. In addition, in FIG. 32, the same step numbers are given to the same processes as those in the fifth embodiment (FIG. 11), and detailed descriptions thereof will be omitted.

First, first user data and domain data of the company A's device 20A and second user data and domain data of the company B's device 20B are acquired so that these can be executed in subsequent processing (steps S11A, S11B). As in the sixth and seventh embodiments, an aggregation image such as that shown in FIG. 13, in which all combinations of the first attribute information and the second attribute information are described, is generated and shared (step S12).

Then, the aggregation image generation unit 22 generates an aggregation target list illustrated on the lower left of FIG. 33, in which combinations excluding non-existent combinations from the combinations described in the generated aggregation image are listed (step S12B).

Thereafter, steps S13 to S18 in FIG. 23 are executed in the same manner as in the fifth embodiment. In addition, as shown in FIG. 33, the aggregation processing unit 27 of the company B's device 20B aggregates the user data (matched data) categorized based on the company B's attribute information for each category, for the combinations described in the aggregation target list, by referring to the above-described aggregation target list, thereby generating aggregated data (step S19B).

Thereafter, the anonymization processing unit 28 of the company B's device 20B performs anonymization processing (here, adding noise generated by the company B using the company A's computation key) on the aggregated data (here, aggregated data from which structured zeros have already been removed), and transmits the aggregated data after anonymization processing to the decryption unit 29 of the first device (company A's device) 20A (step S20). In addition, the decryption unit 29 of the first device (company A's device) 20A decrypts the transmitted aggregated data after anonymization processing, and outputs the decryption result as plain text's statistical information (step S21).

According to the eighth embodiment described above, only the combinations described in the aggregation target list excluding non-existent combinations are aggregation targets. Therefore, it is possible to prevent a situation in which the aggregation results of non-existent combinations (combinations that can be structured zeros) become non-zero values by anonymization processing and the usefulness of the aggregation results (statistical information) is lowered. In addition, as in the fifth embodiment, since all combinations that exist structurally are aggregation targets without omission even if these do not exist in the user data, it is possible to avoid a situation in which unstructured zeros (combinations that exist structurally but are not output) occur. As a result, it is possible to prevent unintended disclosure due to unstructured zeros.

In addition, in the eighth embodiment, an example is shown in which the aggregation results for combinations that are described in the aggregation image but are not described in the aggregation target list (combinations that can be structured zeros) are not output. However, instead of this, a form may be adopted in which the aggregation results for the above combinations are fixed to zero and output.

(Description of Terms and Hardware Configuration (FIG. 34) and the Like)

In addition, the block diagrams used in the description of the above embodiment and modification examples show blocks in functional units. These functional blocks (configuration units) are realized by any combination of at least one of hardware and software. In addition, a method of realizing each functional block is not particularly limited. That is, each functional block may be realized using one physically or logically coupled device, or may be realized by connecting two or more physically or logically separated devices directly or indirectly (for example, using a wired or wireless connection) and using the plurality of devices. Each functional block may be realized by combining the above-described one device or the above-described plurality of devices with software.

Functions include determining, judging, computing, calculating, processing, deriving, investigating, searching, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuration unit) that makes the transmission work is called a transmitting unit or a transmitter. In any case, as described above, the implementation method is not particularly limited.

Figure 34:
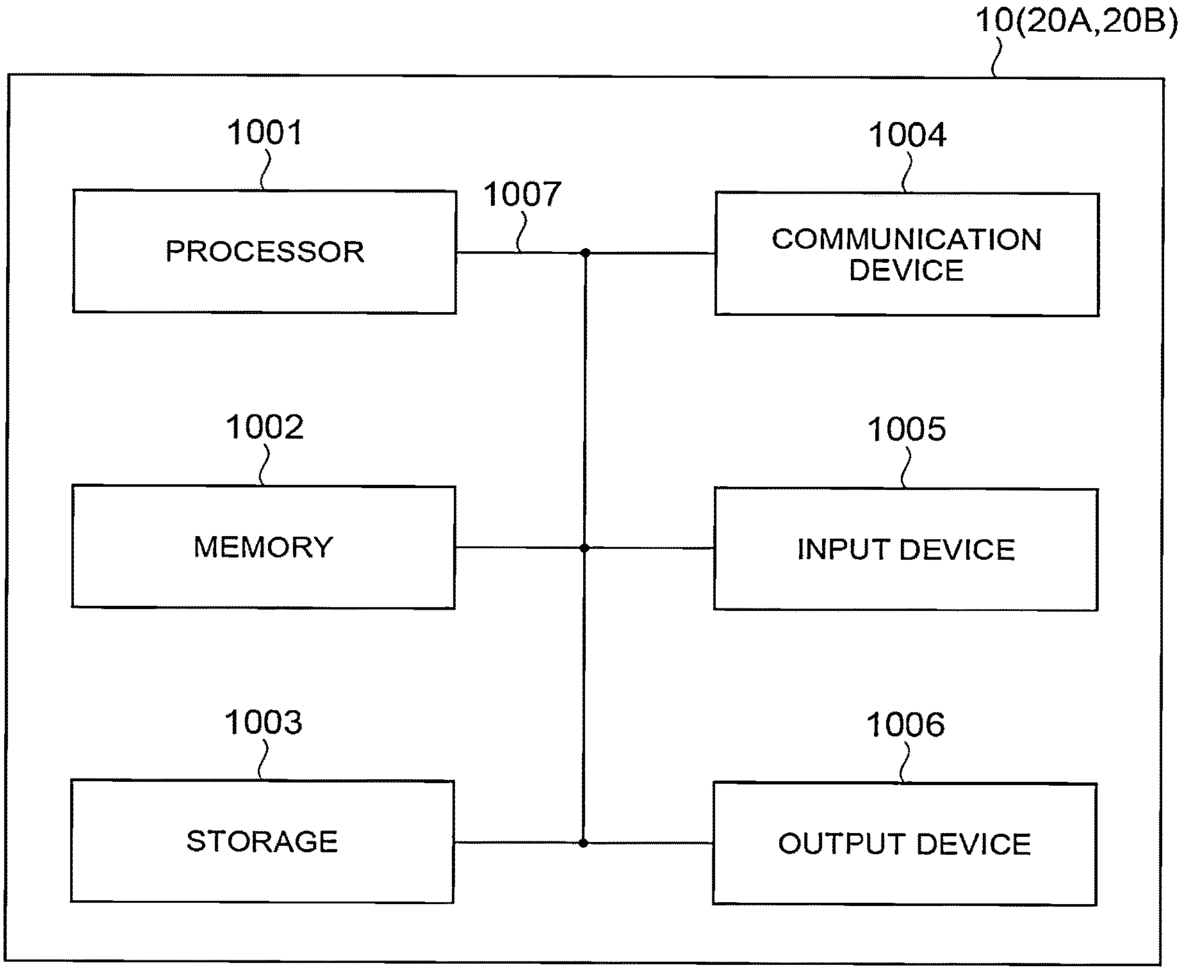
FIG. 34 is a diagram showing an example of the hardware configuration of the privacy-protected data aggregation device.

For example, the privacy-protected data aggregation device according to an embodiment of the present disclosure may function as a computer that performs the processing according to the present embodiment. FIG. 34 is a diagram illustrating an example of the hardware configuration of the privacy-protected data aggregation device 10 according to an embodiment of the present disclosure. The privacy-protected data aggregation device 10 described above may be physically configured as a computer device including a processor 1001, a memory 1002, a storage 1003, a communication device 1004, an input device 1005, an output device 1006, a bus 1007, and the like. In addition, the first device 20A and the second device 20B shown in FIG. 10 may be configured similarly to the privacy-protected data aggregation device 10.

In the following description, the term "device" can be read as a circuit, a unit, and the like. The hardware configuration of the privacy-protected data aggregation device 10 may include one or more devices for each device shown in the diagram, or may not include some devices.

Each function of the privacy-protected data aggregation device 10 is realized by reading predetermined software (program) onto hardware, such as the processor 1001 and the memory 1002, so that the processor 1001 performs an operation and controlling communication by the communication device 1004 or controlling at least one of reading and writing of data in the memory 1002 and the storage 1003.

The processor 1001 controls the entire computer by operating an operating system, for example. The processor 1001 may be a central processing unit (CPU) including an interface with peripheral devices, a control device, a calculation device, a register, and the like.

In addition, the processor 1001 reads a program (program code), a software module, data, and the like into the memory 1002 from at least one of the storage 1003 and the communication device 1004, and performs various kinds of processing according to these. As the program, a program causing a computer to execute at least a part of the operation described in the above embodiment is used. Although it has been described that the various kinds of processes described above are performed by one processor 1001, the various kinds of processes described above may be performed simultaneously or sequentially by two or more processors 1001. The processor 1001 may be implemented by one or more chips. In addition, the program may be transmitted from a network through a telecommunication line.

The memory 1002 is a computer-readable recording medium, and may be at least one of, for example, a ROM (Read Only Memory), an EPROM (Erasable Programmable ROM), an EEPROM (Electrically Erasable Programmable ROM), and a RAM (Random Access Memory). The memory 1002 may be called a register, a cache, a main memory (main storage device), and the like. The memory 1002 can store a program (program code), a software module, and the like that can be executed to implement the wireless communication method according to an embodiment of the present disclosure.

The storage 1003 is a computer-readable recording medium, and may be at least one of, for example, an optical disk such as a CD-ROM (Compact Disc ROM), a hard disk drive, a flexible disk, and a magneto-optical disk (for example, a compact disk, a digital versatile disk, and a Blu-ray (Registered trademark) disk), a smart card, a flash memory (for example, a card, a stick, a key drive), a floppy (registered trademark) disk, and a magnetic strip. The storage 1003 may be called an auxiliary storage device. The storage medium described above may be, for example, a database including at least one of the memory 1002 and the storage 1003, a server, or other appropriate media.

The communication device 1004 is hardware (transmitting and receiving device) for performing communication between computers through at least one of a wired network and a wireless network, and is also referred to as, for example, a network device, a network controller, a network card, and a communication module.

The input device 1005 is an input device (for example, a keyboard, a mouse, a microphone, a switch, a button, and a sensor) for receiving an input from the outside. The output device 1006 is an output device (for example, a display, a speaker, and an LED lamp) that performs output to the outside. In addition, the input device 1005 and the output device 1006 may be integrated (for example, a touch panel). In addition, respective devices, such as the processor 1001 and the memory 1002, are connected to each other by the bus 1007 for communicating information. The bus 1007 may be configured using a single bus, or may be configured using a different bus for each device.

Each aspect/embodiment described in the present disclosure may be used alone, may be used in combination, or may be switched and used according to execution. In addition, the notification of predetermined information (for example, notification of "X") is not limited to being explicitly performed, and may be performed implicitly (for example, without the notification of the predetermined information).

While the present disclosure has been described in detail, it is apparent to those skilled in the art that the present disclosure is not limited to the embodiment described in the present disclosure. The present disclosure can be implemented as modified and changed aspects without departing from the spirit and scope of the present disclosure defined by the description of the claims. Therefore, the description of the present disclosure is intended for illustrative purposes, and has no restrictive meaning to the present disclosure.

In the processing procedure, sequence, flowchart, and the like in each aspect/embodiment described in the present disclosure, the order may be changed as long as there is no contradiction. For example, for the methods described in the present disclosure, elements of various steps are presented using an exemplary order. However, the present invention is not limited to the specific order presented.

Information and the like that are input and output may be stored in a specific place (for example, a memory) or may be managed using a management table. The information and the like that are input and output can be overwritten, updated, or added. The information and the like that are output may be deleted. The information and the like that are input may be transmitted to another device.

The description "based on" used in the present disclosure does not mean "based only on" unless otherwise specified. In other words, the description "based on" means both "based only on" and "based at least on".

When "include", "including", and variations thereof are used in the present disclosure, these terms are intended to be inclusive similarly to the term "comprising". In addition, the term "or" used in the present disclosure is intended not to be an exclusive—OR.

In the present disclosure, when articles, for example, a, an, and the in English, are added by translation, the present disclosure may include that nouns subsequent to these articles are plural.

In the present disclosure, the expression "A and B are different" may mean "A and B are different from each other". In addition, the expression may mean that "A and B each are different from C". Terms such as "separate", "coupled" may be interpreted similarly to "different".

REFERENCE SIGNS LIST

1: privacy-protected data aggregation system, 10: privacy-protected data aggregation device, 11: user data storage unit, 12: domain data storage unit, 13: attribute information encryption unit, 14: aggregation processing unit, 15: anonymization processing unit, 16: decryption unit, 20A: first device, 20B: second device, 21: domain data storage unit, 22: aggregation image generation unit, 23: user data storage unit, 24: first encryption unit, 25: second encryption unit, 26: matching unit, 27: aggregation processing unit, 28: anonymization processing unit, 29: decryption unit, 1001: processor, 1002: memory, 1003: storage, 1004: communication device, 1005: input device, 1006: output device, 1007: bus.

The invention claimed is:

1. A privacy-protected data aggregation device, comprising processing circuitry configured to:

encrypt a plurality of pieces of attribute information included in user data;

aggregate the user data with encrypted attribute information, for all combinations of values of the plurality of pieces of attribute information, to obtain aggregated data including an aggregation result and the encrypted attribute information, the all combinations including combinations that exist structurally without omission even if these do not exist in the user data; and perform anonymization processing on the obtained aggregated data.

2. The privacy-protected data aggregation device according to claim 1, wherein the processing circuitry is configured to fix the aggregation result of a combination that does not exist in the user data among all the combinations of values of the plurality of pieces of attribute information to zero and perform anonymization processing on a combination other than the combination that does not exist in the user data.

3. The privacy-protected data aggregation device according to claim 1, wherein the processing circuitry is configured to aggregate the user data for a combination other than a combination that does not exist in the user data among all the combinations of values of the plurality of pieces of attribute information.

4. The privacy-protected data aggregation device according to claim 1, wherein the processing circuitry is configured to aggregate the user data for a combination excluding a combination that does not exist in the user data from all the combinations of values of the plurality of pieces of attribute information.

* * * * *